(12) United States Patent
Urban et al.

(10) Patent No.: US 12,137,286 B2
(45) Date of Patent: Nov. 5, 2024

(54) METHODS, SYSTEMS, AND APPARATUSES FOR POWER MANAGEMENT OF A VIDEO DOORBELL

(71) Applicant: Comcast Cable Communications, LLC, Philadelphia, PA (US)

(72) Inventors: David Urban, Philadelphia, PA (US); Gary Michael Rekstad, Jr., Philadelpha, PA (US); Vijayanand Dubey, Philadelphia, PA (US); Uday Krishna Garpathi, Philadelphia, PA (US); Benny Pruden, Philadelphia, PA (US); Joseph Rodolico, Philadelphia, PA (US); Joseph Frank, Philadelphia, PA (US); Christopher Stone, Philadelphia, PA (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 25 days.

(21) Appl. No.: 18/093,229

(22) Filed: Jan. 4, 2023

(65) Prior Publication Data
US 2024/0223891 A1    Jul. 4, 2024

(51) Int. Cl.
*H04N 23/65*    (2023.01)
*G06F 1/3296*   (2019.01)
*H04N 7/18*     (2006.01)

(52) U.S. Cl.
CPC ......... *H04N 23/651* (2023.01); *G06F 1/3296* (2013.01); *H04N 7/186* (2013.01)

(58) Field of Classification Search
CPC ..... H04N 7/186; H04N 23/651; G06F 1/3296
See application file for complete search history.

(56) References Cited

U.S. PATENT DOCUMENTS

| | | | |
|---|---|---|---|
| 9,819,867 B2 * | 11/2017 | Siminoff | G08B 13/196 |
| 9,930,300 B2 | 3/2018 | Modestine | |
| 10,834,366 B1 * | 11/2020 | Tretiakov | H02M 7/44 |
| 11,412,187 B2 | 8/2022 | Kasmir | |
| 11,870,345 B2 * | 1/2024 | Cai | H02M 7/4837 |
| 2017/0272653 A1 * | 9/2017 | Siminoff | H04N 23/661 |
| 2021/0183213 A1 | 2/2021 | Rosenberg | |
| 2023/0096741 A1 * | 3/2023 | Cai | H02M 3/157 |
| | | | 323/271 |

* cited by examiner

*Primary Examiner* — Nicholas G Giles
(74) *Attorney, Agent, or Firm* — Ballard Spahr LLP

(57) ABSTRACT

A device (e.g., a security device, a video doorbell, a security camera, etc.) may receive an input voltage and based on the input voltage may determine the input power available to the device. The device may access various power level requirements associated with one or more functional components associated with the device. The device may then determine one or more functional components to activate or set to an active status on the device based on the input power available to the device, component power level requirements for one or more of the functional components, and other factors such as priority levels and preferences.

20 Claims, 9 Drawing Sheets

METHODS, SYSTEMS, AND APPARATUSES FOR POWER MANAGEMENT OF A VIDEO DOORBELL

BACKGROUND

Camera-based devices, such as video doorbells and security cameras, can provide an element of added security to a residence or other premises. These camera-based devices can provide still images, video clips, and round-the-clock video monitoring of a premises or an area around the premises that may be of concern to a user. Conventional camera-based devices can also provide a level of convenience to the user, such as by showing them video of the visitor at their door and allowing the user to interact (e.g., by voice and/or video communication) with the visitor without having the initially go to and open a door the visitor may be at. Furthermore, additional functional components may be included with the camera-based device to, for example, provide an alarm to scare a visitor away or attract attention to the premises, to reduce false activations of the camera-based device, to detect sound levels as a basis for activation of the camera-based device, and to improve transmission rates for the data (e.g., video data, audio data, and/or audio/video data) that is being recorded by the camera-based device.

The camera-based device may require a certain level of input power in order to provide the features associated with all or a certain portion of the functional components of the device. However, when conventional camera-based devices receive insufficient power, the camera-based device itself may be unable to operate. Furthermore, certain camera-based devices may include rechargeable batteries to provide all or at least a portion of the input power needs for the camera-based device. These rechargeable batteries need to be recharged periodically in order to continue powering the camera-based device. When the battery is being recharged, the camera-based device may not be available for use. Not having the camera-based device available for use at certain times may be inconvenient to the user, especially during high risk or high traffic times at the premises.

SUMMARY

It is to be understood that both the following general description and the following detailed description are exemplary and explanatory only and are not restrictive. Methods and systems for communications management are described.

In certain examples, camera-based devices (e.g., video doorbells, security cameras, etc.) may determine the input power being received by the device and information related to power requirements for the functional components of the device. The camera-based device may determine which components to set to an active status (e.g., activate or make available for activation/use), deactivate, and/or modify the activation status or level based on component power level requirements for one or more of the functional components and other factors, such as priority levels and preferences, in order to reduce the amount of power needed for the device to operate. Certain functional components may be then be set to an active status, deactivated, or have their activation status or level modified.

In certain examples, camera-based devices (e.g., video doorbells, security cameras, etc.) may determine that it is not receiving sufficient input power to power all of the functional components of the camera-based device. The camera-based device may determine which functional components to set to an active status (e.g., activate or make available for activation/use), deactivate, and/or modify the activation status or level in order to reduce the amount of power needed for the camera-based device to operate. Certain functional components may be then be set to an active status, deactivated, or have their activation status or level modified.

In certain examples, the camera-based device may determine that a rechargeable battery providing power to the camera-based device needs to be recharged. The camera-based device may receive an indication to delay the recharge process for the battery or to modify the recharge process for the battery so that the camera-based device may continue to function.

This summary is not intended to identify critical or essential features of the disclosure, but merely to summarize certain features and variations thereof. Other details and features will be described in the sections that follow.

BRIEF DESCRIPTION OF THE DRAWINGS

The accompanying drawings, which are incorporated in and constitute a part of the present description serve to explain the principles of the methods, apparatuses, and systems described herein.

DETAILED DESCRIPTION

Figure 1:
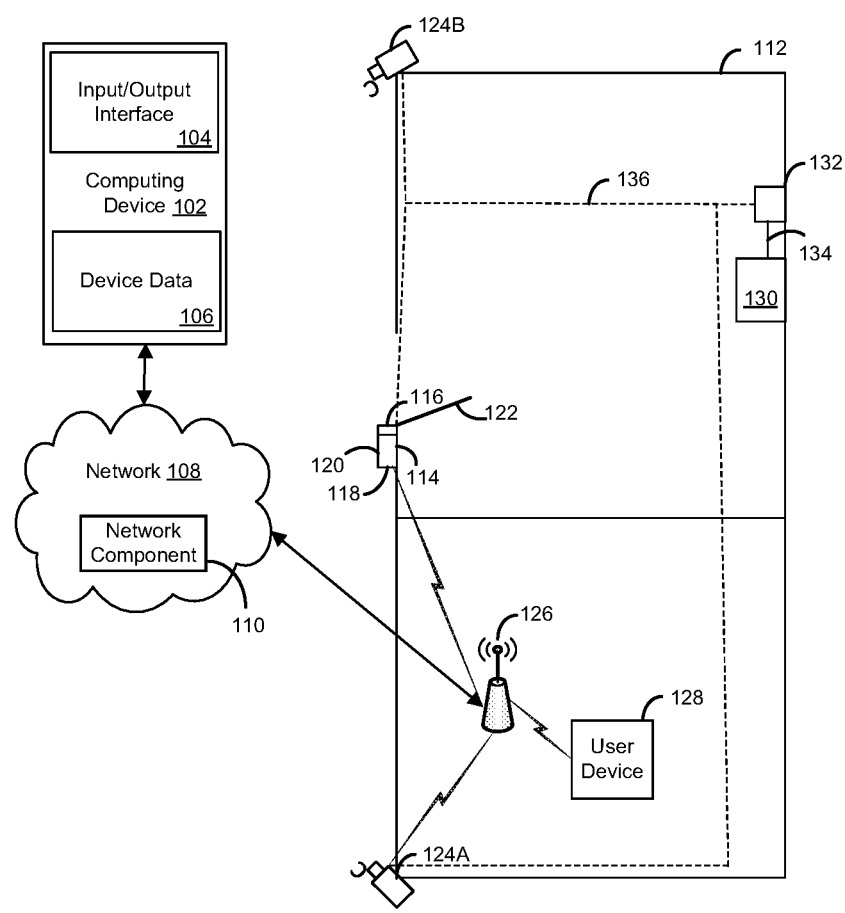
FIG. 1 shows an example system for power management for camera-based devices.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another configuration includes from the one particular value and/or to the other particular value. When values are expressed as approximations, by use of the antecedent "about," it will be understood that the particular value forms another configuration. It will be further understood that the endpoints of each of the ranges are significant both in relation to the other endpoint, and independently of the other endpoint.

"Optional" or "optionally" means that the subsequently described event or circumstance may or may not occur, and that the description includes cases where said event or circumstance occurs and cases where it does not.

Throughout the description and claims of this specification, the word "comprise" and variations of the word, such as "comprising" and "comprises," means "including but not limited to," and is not intended to exclude other components, integers or steps. "Exemplary" means "an example of" and is not intended to convey an indication of a preferred or ideal configuration. "Such as" is not used in a restrictive sense, but for explanatory purposes.

It is understood that when combinations, subsets, interactions, groups, etc. of components are described that, while specific reference of each various individual and collective combinations and permutations of these may not be explicitly described, each is specifically contemplated and described herein. This applies to all parts of this application including, but not limited to, steps in described methods. Thus, if there are a variety of additional steps that may be performed it is understood that each of these additional steps may be performed with any specific configuration or combination of configurations of the described methods.

As will be appreciated by one skilled in the art, hardware, software, or a combination of software and hardware may be implemented. Furthermore, a computer program product on a computer-readable storage medium (e.g., non-transitory) having processor-executable instructions (e.g., computer software) embodied in the storage medium. Any suitable computer-readable storage medium may be utilized including hard disks, CD-ROMs, optical storage devices, magnetic storage devices, memresistors, Non-Volatile Random Access Memory (NVRAM), flash memory, or a combination thereof.

Throughout this application reference is made to block diagrams and flowcharts. It will be understood that each block of the block diagrams and flowcharts, and combinations of blocks in the block diagrams and flowcharts, respectively, may be implemented by processor-executable instructions. These processor-executable instructions may be loaded onto a general purpose computer, special purpose computer, or other programmable data processing apparatus to produce a machine, such that the processor-executable instructions which execute on the computer or other programmable data processing apparatus create a device for implementing the functions specified in the flowchart block or blocks.

These processor-executable instructions may also be stored in a computer-readable memory that may direct a computer or other programmable data processing apparatus to function in a particular manner, such that the processor-executable instructions stored in the computer-readable memory produce an article of manufacture including processor-executable instructions for implementing the function specified in the flowchart block or blocks. The processor-executable instructions may also be loaded onto a computer or other programmable data processing apparatus to cause a series of operational steps to be performed on the computer or other programmable apparatus to produce a computer-implemented process such that the processor-executable instructions that execute on the computer or other programmable apparatus provide steps for implementing the functions specified in the flowchart block or blocks.

Accordingly, blocks of the block diagrams and flowcharts support combinations of devices for performing the specified functions, combinations of steps for performing the specified functions and program instruction means for performing the specified functions. It will also be understood that each block of the block diagrams and flowcharts, and combinations of blocks in the block diagrams and flowcharts, may be implemented by special purpose hardware-based computer systems that perform the specified functions or steps, or combinations of special purpose hardware and computer instructions.

This detailed description may refer to a given entity performing some action. It should be understood that this language may in some cases mean that a system (e.g., a computer) owned and/or controlled by the given entity is actually performing the action.

Methods and systems are described herein for power management of camera-based devices (e.g., video doorbells, video cameras, etc.). FIG. 1 shows an example system 100. The example system 100 may be configured for power management of camera-based devices or any other device that includes a rechargeable battery system. Although only certain devices and/or components are shown, the system 100 may comprise a variety of other devices and/or components that support a wide variety of network and/or communication functions, operations, protocols, services, and/or the like. The system 100 may comprise a plurality of computing devices/entities in communication via a network 108. The network 108 may be an optical fiber network, a coaxial cable network, a hybrid fiber-coaxial network, a wireless network, a satellite system, a direct broadcast system, an Ethernet network, a high-definition multimedia interface network, a Universal Serial Bus (USB) network, or any combination thereof. Data may be sent on the network 108 via a variety of transmission paths, including wireless paths (e.g., satellite paths, Wi-Fi paths, cellular paths, etc.) and terrestrial paths (e.g., wired paths, a direct feed source via a direct line, etc.). The network 108 may comprise public networks, private networks, wide area networks (e.g., Internet), local area networks, and/or the like.

The network 108 may comprise a content access network, content distribution network, security network, and/or the like. For example, the network 108 may be configured to provide content and/or data from a variety of sources using a variety of network paths, protocols, devices, and/or the like. The network 108 may also be configured to receive security data (e.g., from one or more camera-based devices and/or for one or more camera-based devices) and provide the security data to one or more devices (e.g., camera-based devices, user device, computing devices, etc.). For example, the network 108 may represent multiple separate networks, each providing one or more of the services described above. The network 108 may be managed (e.g., deployed, serviced) by, for example, a content provider, a service provider, and/or the like. The network 108 may deliver content (e.g., video, audio, audio/video) from one or more camera-based devices to one or more other computing devices (e.g., user devices).

The network 108 may comprise or be in communication with a network component 110. The network component 110 may be any device, module, combinations thereof, and the like communicatively coupled to the network 108. The network component 108 may be a router, a switch, a splitter, a packager, a gateway, an encoder, a storage device, a multiplexer, a network access location (e.g., tap), physical link, combinations thereof, and the like.

The system 100 may comprise a computing device 102. The computing device 102 may be a server. For example, the server may comprise one or more computing devices. For example, the computing device 102 may be a cloud-based server. For example, the computing device 102 may be an application-based server associated with a security application and/or video doorbell application. The computing device 102 may be configured to receive audio data, video data, and/or audio/video data (e.g., security data) from camera-based devices (e.g., video doorbells 132 and/or security cameras 124A-B). For example, the computing device 102 may be configured to store the received audio data, video data, and/or audio/video data. The security data may include or be associated with metadata. For example, the metadata may include a camera-based device identifier and/or user identifier. The user identifier may identify the user or users associated with the one or more camera-based devices, contact information for the user, a location or address for the user, a URL or network address associated with the user, a MAC address associated with the user, a phone number associated with the user, an email address associated with the user, and/or URLs or network addresses associated with one or more user devices associated with the user. The computing device 102 may be configured to identify one or more user devices (e.g., user device 128) associated with the camera-based device from which the data was received and to send all or a portion of the received audio data, video data, and/or audio/video data to the user device 128. For example, the computing device 102 may be configured to receive messages or notifications comprising requests to control or modify the control of the one or more camera-based devices 114, 124A-B. For example, the messages or notifications may be received from the user device 128. The computing device 102 may be configured to determine the camera-based device 114, 124A-B associated with the message or notification and send the message or notification to the camera-based device 114, 124A-B to control or modify the control (e.g., modify the recharge process) of the camera-based device 114, 124A-B. For example, the computing device 102 may comprise an input/output interface 104. The input/output interface 104 may be configured to connect or initiate a communication session between the computing device 102 and one or more of the user device 128 or the camera-based device 114, 124A-B via the network 114 or another network.

The computing device 102 may be configured to store all or at least a portion of the received audio data, video data, and/or audio/video data received from the camera-based device 114, 124A-B. For example, the computing device 102 may comprise a device database (e.g., one or more hard drives) for storing the received security data and camera-based device data 106. For example, the computing device 102 may determine, based on the metadata or another portion of the security data, one or more users or identifiers to associate the received security data and/or device data with. The computing device 102 may then store the received security data and/or device data in the device database based on the association. For example, the security data may be associated with a user name, user phone number, user address, the one or more camera-based devices associated with a user, a MAC address associated with the user, an email address associated with the user, or in any other manner.

The computing device 102 may also comprise camera-based device data 106. The camera-based device data 106 may comprise one or more of the camera-based device identifiers (e.g., a name, unique number, or location for the camera-based devices 114, 124A-B, user identifiers (e.g., user name, user number, user address, user phone number, etc.) associated with the camera-based device identifiers, recharge processes for the camera-based device 114, 124A-B and associated with the camera-based device identifier and/or the user identifier, functional component listings for the camera-based devices 114, 124A-B, expected power usage for each functional component of the camera-based device 114, 124A-B, recharge status for batteries of the particular camera-based device 114, 124A-B and associated with the camera-based device identifier, contact information (e.g., a phone number, email address, URL, etc.) for a user associated with the user identifier, etc.

The system 100 may comprise a premises 112. The premises 112 may be a building, portion of a building, house, townhouse, condominium, apartment, duplex, office, or the like. The premises 112 may be occupied by one or more users. The premises 112 may comprise a point of entry (e.g., a doorway). Access may be restricted through the point of entry by one or more doors 122, which may be adjustable from an open position to a closed position. The premises 112 may also include one or more rooms and/or one or more floors.

The premises 112 may comprise a circuit breaker panel or fuse panel 130 (hereinafter referred to as circuit breaker panel 130). The circuit breaker panel 130 may be configured to receive mains power via one or more transmission lines from a remote power source. The mains power may be high voltage alternating current (AC) electricity (e.g., 120 volt AC). The premises 112 may comprise a transformer 132 electrically coupled to the circuit breaker panel 130 via a transmission line 134. The transformer 132 may be configured to transform the received high voltage AC electricity into low voltage (AC) (e.g., any voltage between and including 4 volts to 60 volts) electricity. For example, the transformer 132 may be an 8-volt transformer, a 12-volt transformer, a 16-volt transformer, or another size of transformer 132. The premises 112 may also comprise one or more low-voltage transmission lines 136. The low-voltage transmission lines may electrically couple the transformer 132 to the one or more camera-based devices 114, 124A-B to provide AC electricity to the one or more camera-based devices 114, 124A-B.

The system 100 may also include one or more camera-based devices, such as the video doorbell 114 and/or the video cameras 124A-B. The camera-based devices 114, 124A-B may be located at any location along the premises 112. For example, the video doorbell 114 may be located adjacent to or near the point of entry and the door 122 along an exterior of the premises 112. For example, the one or more video cameras 124A-B may be located along or near the exterior of the premises 112.

The video doorbell 114 may comprise a camera 116, a microphone 118, an activation device 120, a speaker, a transmitter, a receiver (or transceiver), and one or more processors. The activation device 120 may be a doorbell button, a doorbell switch, a doorbell touchpad, a capacitive sensor, a motion sensor, an audio sensor, an infrared sensor, or other similar device. For example, the video doorbell may be activated based on the use or triggering of the activation device 120. For example, a visitor may depress the activation device 120 to activate a doorbell chime, the camera 116, and the microphone 118 to begin recording the security data. The video doorbell 114 may be configured to record security data such as video data, via the camera 116, and audio data, via the microphone 118. The video doorbell 114 may be configured to initiate a communication session with the computing device 102 and send the security data, via the transmitter or transceiver, to the computing device 102 via the network 108 or another network. The video doorbell 114 may be configured to receive audio data, such as from the user device 128, via the receiver or transceiver, and output the audio data via the speaker of the video doorbell 114. For example, the audio data may comprise user voice data.

Each video camera 124A-B may comprise a camera, a microphone, an activation device (e.g., one or more sensors), a speaker, a transmitter, a receiver (or transceiver), and one or more processors. The activation device may be one or more of a motion sensor, an audio sensor, an infrared sensor, a Doppler sensor, or other similar device. For example, all or a portion of the functional components of the video camera 124A-B may be activated based on the triggering of the activation device. For example, a person may pass within a viewing window of the video camera 124A-B and/or the activation device of the video camera 124A-B to activate the camera and the microphone to begin recording the security data. The video camera 124A-B may be configured to record security data, such as video data, via the camera, and audio data, via the microphone. The video camera 124A-B may be configured to initiate a communication session with the computing device 102 and send the security data, via the transmitter or transceiver, to the computing device 102 via the network 108 or another network. The video camera 124A-B may be configured to receive audio data, such as from the user device 128, via the receiver or transceiver, and output the audio data via the speaker of the video camera 124A-B. For example, the audio data may comprise user voice data.

The system 100 may comprise the gateway device 126. The gateway device 126 may comprise a local gateway (e.g., router, modem, switch, hub, combinations thereof, and the like) configured to connect (or facilitate a connection (e.g., a communication session) between) a local area network (e.g., a LAN) to a wide area network (e.g., a WAN) such as the network 108. The gateway device 128 may be associated with the premises 112. The gateway device 128 may configured to receive incoming data (e.g., data packets or other signals) from the network 108 and route the data to one or more other devices associated with the premises 112 (e.g., the user device 128 or one or more of the camera-based devices 114, 124A-B, or combinations thereof, and the like. The gateway device 126 may be configured to communicate with the network 108. The gateway device 126 may be configured for communication with the network 108 via a variety of protocols, such as IP, transmission control protocol, file transfer protocol, session initiation protocol, voice over IP (e.g., VOIP), combinations thereof, and the like. The gateway device 126 may be configured to facilitate network access via a variety of communication protocols and standards, such as Data Over Cable Service Interface Specification (DOCSIS).

The gateway device 126 may be configured to receive messages, notifications, and/or audio data (e.g., user voice data) from the user device 120 and send the messages, notifications, and/or audio data to the one or more camera-based devices 114, 124A-B and/or the computing device 102 via the network 108 or another network. The gateway device 126 may be configured to receive messages or notifications associated with one or more commands or requests from the computing device 102 and/or security data from the computing device 102, via the network 108 or another network, and may send the received messages, notifications, and/or data to the user device 128 and/or one or more camera-based devices 114, 124A-B.

The system 100 may comprise one or more user devices 128. For example, a user device 128 may receive security data, messages, and/or notifications (e.g., audio data, video data, or audio/video data) associated with one or more of the camera-based devices 114, 124A-B from the network 108. For example, the user device 128 may send the audio data (e.g., user voice data) and messages or notifications comprising instructions or commands for operations associated with the camera-based devices 114, 124A-B to one or more of the camera-based devices 114, 124A-B and/or the computing device 102. The user device 128 may be configured to communicate with the camera-based devices 114, 124A-B via wireless communications. For example, the wireless communications may be one or more of Bluetooth, Bluetooth Low Energy, WiFi, radio frequency (RF), Zigbee, or another wireless communication protocol. The user device 128 may be the voice-enabled remote control 122, a client device, a personal computer, computing station, workstation, portable computer, laptop computer, mobile phone, tablet device, smartphone, smartwatch, or the like). Each of the user devices 128 may also be voice-enabled and may be configured to receive the user voice data. The user device 128 may communicate with a variety of gateways, such as the gateway 126.

Figure 2:
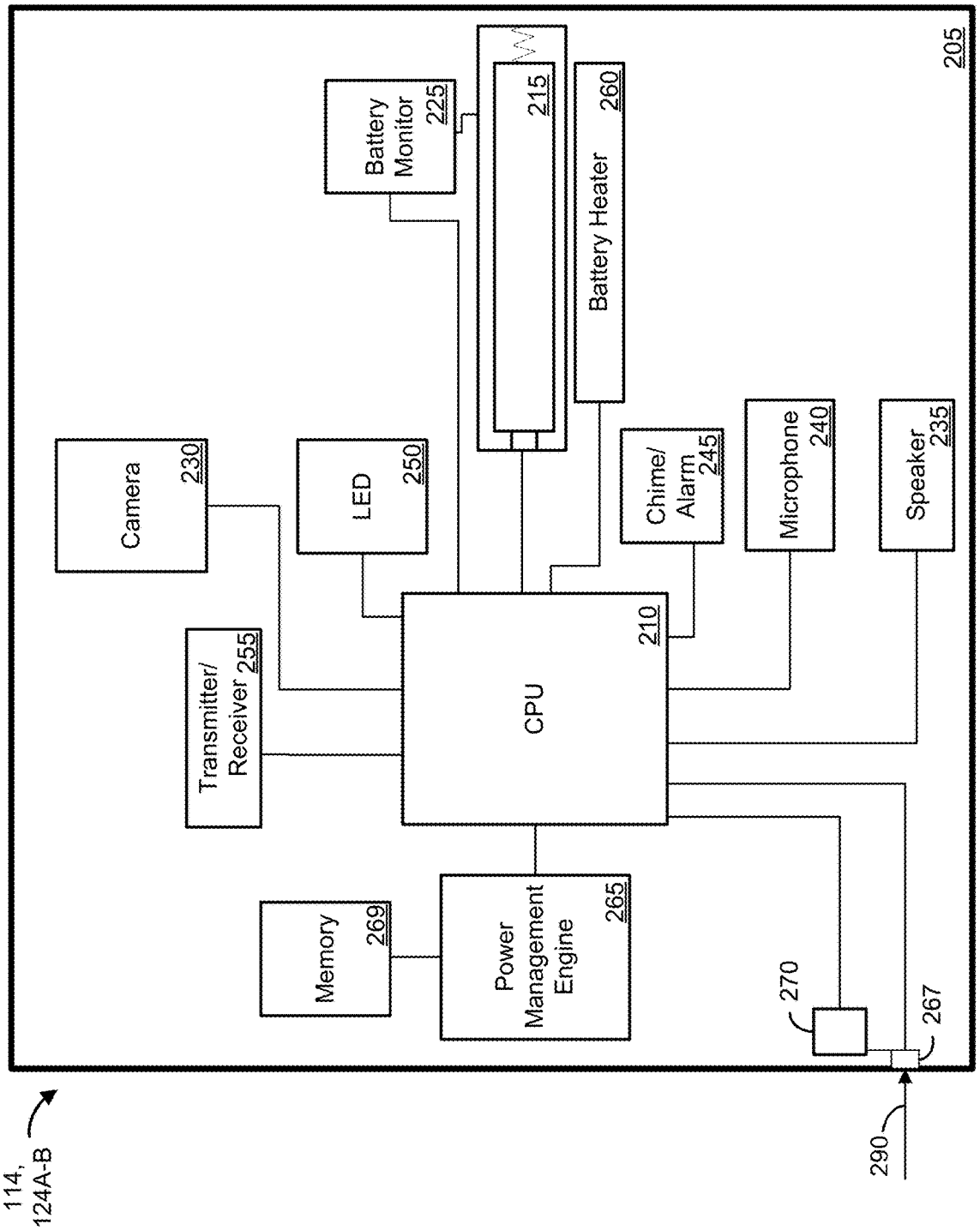
FIG. 2 shows an example architecture for a camera-based device.

FIG. 2 is an example device architecture for the camera-based device. For example, the camera-based device may comprise one or more of the video doorbell 114 or the video camera 128A-B). The camera-based device 114, 124A-B may be a wired or wireless device and may be configured to receive power from one or more of the transmission line 136 or a battery 215.

The camera-based device 114, 124A-B may comprise a housing 205. The housing 205 may comprise one or more walls. For example, the walls may comprises a front wall, a rear wall, and a plurality of side walls extending from the front wall to the rear wall. The walls may be made of plastic, metal, ceramic or a combination thereof. The walls of the housing 205 may define a cavity for receiving all or at least a portion of one or more functional components of the camera-based device 114, 124A-B.

The camera-based device 114, 124A-B may comprise one or more processors 210. The one or more processors 210 may be disposed within the cavity of the housing 205. The one or more processors 210 may comprise any one of a microcontroller, microprocessor, embedded processor, a digital signal processor, or a media processor. The one or more processors 210 may include one or more circuit boards. In the case of multiple processors 210, the camera-based device 114, 124A-B may utilize parallel computing. The one or more processors 210 may be configured to operate at a plurality of processing speeds. For example, the one or more processors 210 may be configured to operate at a first processing speed and a second processing speed that is less than the first processing speed. For example, the one or more processors 210 may be configured to use a first amount of power at the first processing speed and a second amount of power at the second processing speed. The second amount of power may be less than the first amount of power.

The camera-based device 114, 124A-B may also comprise or alternatively comprise a system on a chip (SOC) (not shown). The SOC may comprise one or more integrated circuits, one or more computer processing units (CPUs), one or more processors, flash memory, random access memory, system memory, graphics processing units, and other functional components for managing the operations of the camera-based device 114, 124A-B.

The camera-based device 114, 124A-B may comprise a battery housing and one or more batteries 215. The one or more batteries 215 may be configured to provide DC voltage to the camera-based device 114, 124A-B. The one or more batteries 215 may be electrically coupled to the processor 210 and/or other portions of the camera-based device 114, 124A-B. The one or more batteries 215 may be rechargeable batteries. For example, the one or more batteries 215 may be any one of a lead-acid battery, a nickel-cadmium battery, a nickel-metal hydride battery, or a lithium ion battery.

The camera-based device 114, 124A-B may comprise a battery heater 260. The battery heater 260 may be disposed adjacent to the battery housing and the one or more batteries 215. The battery heater 260 may comprises one or more battery heater elements configured to convert electrical power into heat. The battery heater 260 may be communicably coupled to at least one of the one or more processors 210. The battery heater 260 may be configured to generate heat to warm the one or more batteries 215. At least one of the one or more processors 210 may be configured to activate and deactivate the battery heater 260, as needed, based on one or more of an air temperature or a temperature of the one or more batteries 215. The battery heater 260 may be configured to operate at a plurality of heating levels. For example, the battery heater 260 may be configured to operate at a first heating level (or temperature) and a second heating level (or temperature) that is less than the first heating level (or temperature). For example, the battery heater 260 may be configured to use a first amount of power at the first heating level and a second amount of power at the second heating level. The second amount of power may be less than the first amount of power.

The camera-based device 114, 124A-B may comprise a battery monitor 225. The battery monitor 225 may be communicably coupled to the one or more batteries 215 and the one or more processors 210. The battery monitor 225 may be configured to one or more of determine the current charge level in the one or more batteries 215 or to determine the amount of time before the one or more batteries 215 will be depleted of power or reach a threshold recharge level (which may be greater than the battery depletion level. For example, the battery monitor 225 may be configured to measure the capacity of the one or more batteries 215 in milliamp hours (mAH). For example, the battery monitor 225 may be configured to measure the capacity of the one or more batteries 215 in volts. For example, the battery monitor 225 may be configured to measure the voltage of the input and output (I/O) of the one or more batteries 215 to determine the power status or power level for the one or more batteries 215.

The camera-based device 114,124A-B may comprise an AC-to-DC converter 267. The AC-to-DC converter 267 may be configured to receive the input AC voltage 290 from the transformer 132 and convert that input AC voltage 290 to a direct current (DC) voltage.

The camera-based device 114, 124A-B may comprise an analog-to-digital converter 270. The analog-to-digital converter 270 may be configured to sample (e.g., periodically, at particular time points, such as start-up of the device 114, 124A-B, or randomly) the DC voltage created from the AC-to-DC converter 267. The analog-to-digital converter 270 may be communicably coupled to at least one of the one or more processors 210. The analog-to-digital converter 270 may be configured to send that plurality of sampled DC voltage values to at least one of the one or more processors 210. For example, the plurality of sampled DC voltage values determined by the analog-to-digital converter 270 may be evaluated to determine a minimum input voltage (e.g., a minimum input DC voltage) being received by the camera-based device 114, 124A-B and/or output by the AC-to-DC converter 267. For example, the analog-to-digital converter 270 may comprise one of an 8-bit analog-to-digital converter, a 10-bit analog-to-digital converter or a 16-bit analog-to-digital converter.

The camera-based device 114, 124A-B may comprise a light source 250. For example, the light source 250 may comprise a light emitting diode (LED) light source 250. For example, the LED may be in infrared (IR) LED, a visible LED, or any combination of an IR LED and a visible LED. For example, the LED 250 may be communicably coupled to at least one of the one or more processors 210. While the example camera-based device 114, 124A-B of FIG. 2 shows a single LED light source 250, this is for example purposes only as the camera-based device 114, 124A-B may comprise a plurality of LED light sources 250 in other examples. The LED 250 may be configured to operate at a plurality of light output intensities or power output levels (e.g., lumen output levels for the visible LED or microwatts/centimeter squared ($uW/cm^2$ for IR LED). For example, the LED 250 may be configured to operate at a first light intensity or power output level (e.g., a first lumen level for visible LED or first $uW/cm^2$ level for IR LED) and a second light intensity or power output level (e.g., second lumen level for visible LED or second $uW/cm^2$ level for IR LED) that is less than the first light intensity or power output level. For example, the LED 250 may be configured to use a first amount of power at the first light intensity or power output level and a second amount of power at the second light intensity or power output level. The second amount of power may be less than the first amount of power.

The camera-based device 114, 124A-B may comprise a chime and/or alarm generator 245. For example, the chime/alarm generator 245 may be configured to send a signal (e.g., a voltage or power) to a chime device positioned somewhere within the premises 112 when a button is depressed or contacted on a video doorbell 114. The chime/alarm generated 245 may also be configured to generate a chime (e.g., an audible sound) at the camera-based device 114, 124A-B via the speaker 235. For example, the chime/alarm generator 245 may be configured to generate a form of alarm (e.g., siren) to be output at the camera-based device 114, 124A-B when a signal to do so is received from the user device 128 or another computing device. The chime/alarm generator 245 may be communicably coupled to at least one of the one or more processors 210 and the speaker 235.

The camera-based device 114, 124A-B may comprise a microphone 240. For example, the microphone 240 may be configured to receive sound data (e.g., a person's voice, sounds of nature, etc.) that is generated near the camera-based device 114, 124A-B. At least a portion of the microphone may be positioned along an exterior of the housing 205. The microphone 240 may be communicably coupled to at least one of the one or more processors 210.

The camera-based device 114, 124A-B may comprise a speaker 235. For example, the speaker 235 may be configured to output sound data (e.g., a person's voice) that is generated from an area away from the camera-based device 114, 124A-B. At least a portion of the speaker 235 may be positioned along an exterior of the housing 205. The speaker 235 may be communicably coupled to at least one of the one or more processors 210.

The camera-based device 114, 124A-B may comprise one or more cameras 230. At least a portion of the one or more cameras 230 may be disposed along an exterior of the housing 205. The one or more cameras 230 may comprise an image sensor, a lens, and an image sensor processor. For example, the image sensor processor may be incorporated into the SOC. The one or more cameras 230 may be configured to record video and/or still images (collectively "video data") of an area adjacent to the camera-based device 114, 124A-B. The one or more cameras 230 may be configured to record video continuously (e.g., 24 hours a day, 7 days a week) or for a predetermined period of time (e.g., any amount of time between and including 1 second to 1 hour)

after the camera-based device 114, 124A-B has been activated. For example, the camera-based device 114, 124A-B may be activated by a visitor depressing a doorbell button associated with the camera-based device or one or more sensors (not shown) (e.g., motion sensors, infrared sensors, Doppler sensors) detecting the possible presence of a person or activity in the vicinity of the camera-based device 114, 124A-B. The video data may be stored locally at the camera-based device 114, 124A-B or sent by the video device to another computing device. For example, the video data may be sent to the computing device 102 via the gateway device 126, and the network 108 or another network. The one or more cameras 230 may be communicably coupled to at least one of the one or more processors 210. The one or more cameras 230 may be configured to record video at multiple resolutions. For example, the video resolution that the camera records at may be modified based on the input power of the camera-based device 114, 124A-B. For example, the one or more cameras 230 may be configured to record video at a first video resolution (or for a first amount of time) and a second video resolution (or a second amount of time) that is less than the first video resolution (or first amount of time). For example, the one or more cameras 230 may be configured to use a first amount of power for recording at the first video resolution (or for recording for the first amount of time) and a second amount of power for recording at the second video resolution (or for recording for the second amount of time). The second amount of power may be less than the first amount of power.

The camera-based device 114, 124A-B may comprise a transmitter/receiver or transceiver 255. The transmitter/receiver 255 may be configured to wirelessly send data from the camera-based device 114, 124A-B and receive data at the camera-based device 114, 124A-B. For example, the transmitter/receiver 255 may be configured to communicate via one or more wireless protocols, such as WI-FI, Bluetooth, Bluetooth Low Energy (BLE), Zigbee, or another wireless standard). For example, the transmitter/receiver 255 may be configured to send video and audio data received as inputs from the camera-based device 114, 124A-B and may be configured to receive audio data for output at the camera-based device 114, 124A-B. The transmitter/receiver 255 may be communicably coupled to at least one of the one or more processors 210 and to an antenna (not shown) disposed on the camera-based device 114, 124A-B. The transmitter/receiver 255 may be configured to generate a wireless signal at multiple different power levels. For example, the power level of the wireless signal may be modified based on the input power of the camera-based device 114, 124A-B. For example, the transmitter/receiver 255 may be configured to generate a wireless signal at a first signal power level and a second signal power level that is less than the first signal power level. For example, the transmitter/receiver 255 may be configured to use a first amount of power for generating the wireless signal at the first signal power level and a second amount of power for generating the wireless signal at the second signal power level. The second amount of power may be less than the first amount of power.

The camera-based device 114, 124A-B may comprise a power management engine 265. The power management engine 265 may be configured to evaluate the input power coming into the camera-based device 114, 124A-B and determine if certain functional components (e.g., the one or more processors 210, the camera 230, the chime/alarm 245, the LED 250, the transmitter/receiver 255, the battery heater 260, etc.) need to be activated, deactivated, or have their activation status modified or adjusted to reduce power usage by the camera-based device 114, 124A-B in view of the input power.

For example, the power management engine 265 may comprise or have access to information for (e.g., associated with) one or more (e.g., each) of the functional components (e.g., the components that need a portion of the input power to operate) of the camera-based device 114, 124A-B. For example, the information may comprise an indication or identifier of each functional component of the camera-based device 114, 124A-B, one or more operating levels (e.g., activation status), if multiple operating levels are available for the particular functional component, for each functional component, a power level (e.g., a minimum or average power level or amount of power) required to operate each particular functional component at the particular operating level, a priority level for one or more of the functional components or groups of functional components that signifies or designates an order in which the functional components should be activated, deactivated, and/or have their operating levels adjusted, and/or a user preference designation for one or more of the functional components that signifies or designates an order in which the user has selected which functional components should be activated, deactivated, and/or have their operating levels adjusted or provides a listing of the functional components that the user has identified as having to be activated. For example, the information may be stored in memory 269 and accessed by the power management engine 265.

The power management engine 265 may also be configured to evaluate the current battery level for the battery 215 to determine if the battery 215 needs to be recharged and, based on the power needs of the camera-based device 114, 124A-B, determine if one or more functional components need to be deactivated or have their activation status modified or adjusted during the recharging process. The power management engine 255 may be communicably coupled to at least one of the one or more processors 210 of the camera-based device 114, 124A-B.

Figure 3:
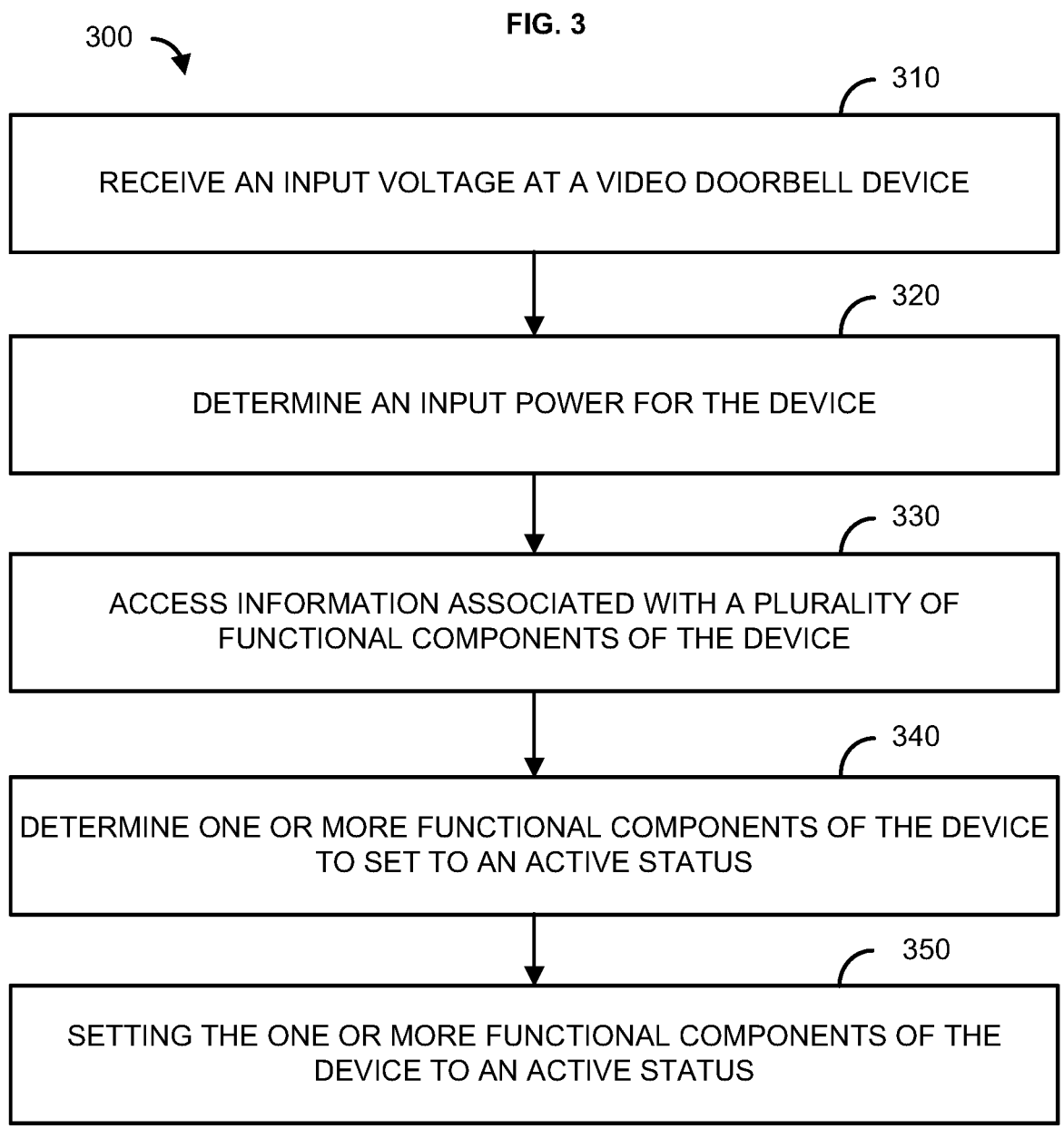
FIG. 3 shows a flowchart of an example method for power management of a camera-based device.

FIG. 3 shows a flowchart of an example method 300 for power management of a camera-based device. The methods described in FIG. 3 may be completed by the camera-based device (e.g., the video doorbell 114 or the video camera 124A-B). While the method 300 will describe as being completed by the video doorbell 114, this is for example purposes only, as all or any portion of the method 300 may be completed by another form of camera-based device (e.g., the video camera 124A-B, a security device, etc.) or any other computing device described herein, such as the computing device 102.

At 310, an input voltage may be received at a video doorbell device 114. For example, the input voltage may be received from the transformer 132, which receives line voltage from mains power at, for example, the circuit breaker panel 130 of the premises 112. For example, the input voltage may be AC voltage. For example the AC voltage may be low voltage AC (e.g., any amount between and including 4 volts to 60 volts AC). The input voltage may be received at the video doorbell device 114, by an analog-to-digital converter 270 of the video doorbell device 114.

At 320, the input power for the video doorbell device 114 may be determined. For example, the input power may be determined by the video doorbell device 114. For example, the input power may be determined based on the received input voltage at the video doorbell device 114. For example, the input power may be determined by the power management engine 265 or another portion of the video doorbell device 114. For example, the analog-to-digital converter 270, or another portion of the video doorbell device 114, may sample the input voltage one or a plurality of times to determine a minimum input voltage level being received at the video doorbell device 114. The power management engine 265 may receive the one or more input voltage samplings from the converter 270. For example, the minimum input voltage may be the lowest input voltage identified by the converter 270 from the plurality of voltage samplings. For example, the minimum input voltage may be an average of the lowest input voltages identified in each of the samplings of the input voltage. For example, the minimum input voltage level may be determined based on the received input voltage by determining the voltage level of the received input voltage without determining a minimum received input voltage level.

Based on the minimum input voltage, the power management engine 265 may determine the input power (in watts) for the video doorbell device 114. For example, the input power may be based on input voltage originating from one or more of mains power 130 (via the transformer 132) or the battery 215. For example, the input power may be determined based on the minimum input voltage and the current for the video doorbell device 114. For example, the input power may be determined based on a product of the minimum input voltage and the current for the video doorbell device 114.

The power management engine 265 or another portion of the video doorbell device 114 may also determine the size (output voltage) of the transformer 132. For example, the power management engine 265 may determine the output voltage for the transformer based on the input power and/or input voltage received by the video doorbell device 114 at the analog-to-digital converter. For example, the size (output voltage) of the transformer 132 may be greater than the input voltage received by the video doorbell device 114 due to loss in the transmission lines 136 between the transformer 132 and the video doorbell device 114. For example, the power management engine 265 may determine that the transformer 132 is an 8-volt transformer based on the input voltage being less than 8 volts at the video doorbell device 114. For example, the power management engine 265 may determine that the transformer 132 is a 16-volt transformer based on the input voltage at the video doorbell device 114 being greater than 8 volts but less than 16 volts.

At 330, information (e.g., data) may be accessed. The information may be associated with a plurality of functional components for the video doorbell device 114. For example, the information may comprise an indication or identifier of each functional component of the video doorbell device 114, one or more operating levels (e.g., activation status), if multiple operating levels are available for the particular functional component, for each functional component, a power level (e.g., a minimum or average power level or amount of power) required to operate each particular functional component at the particular operating level, a priority level for one or more of the functional components or groups of functional components that signifies or designates an order in which the functional components should be activated (e.g., set to an active status or turned on), deactivated (e.g., no power is provided to the component), and/or have their operating levels adjusted, and/or a user preference designation for one or more of the functional components that signifies or designates an order in which the user has selected which functional components should be activated (e.g., set to an active status or turned on), deactivated (e.g., no power is provided to the component), and/or have their operating levels adjusted or provides a listing of the functional components that the user has identified as having to be activated (e.g., set to an active status or turned on). For example, the information may be accessed by the power management engine 265. For example, the information may be accessed from one or more of the memory 269 or the power management engine 265.

For example, the input power may be determined to not satisfy (e.g., is not equal to or greater than) a power threshold for the video doorbell device 114. For example, the determination may be made by the power management engine 265 or another portion of the video doorbell device 114. For example, the power threshold may indicate the minimum amount of input power needed to power all of the functional components of the video doorbell device 114. For example, the power threshold may be a preset value for the video doorbell device 114 or may be determined (e.g., calculated) by the power management engine 265.

For example, the input power may be determined to satisfy (e.g., is less than) a below power threshold for the video doorbell device 114. For example, the determination may be made by the power management engine 265 or another portion of the video doorbell device 114. For example, the below power threshold may indicate the minimum amount of input power needed to power all of the functional components of the video doorbell device 114. For example, the below power threshold may be a preset value for the video doorbell device 114 or may be determined (e.g., calculated) by the power management engine 265. For example, the below power threshold may be the same value as the power threshold and is provided herein with a different indicator based on determining whether or not the threshold is satisfied.

For example, the power management engine 265 may activate or turn on a functional component for the video doorbell device 114. For example, the functional component may have a known expected power usage. For example, the functional component may be the LED 250 (e.g., the IR LED or visible LED) or any other functional component of the video doorbell device 114. The power management engine 265 may determine the amount of actual power used by the functional component. The power management engine 265 may compare the actual power used by the functional component to the expected power usage for the functional component (e.g., included in the information of memory 269). For example, the power management engine 265 may determine the difference between the actual power used by the functional component and the expected power usage for the functional component. The difference may be determined to be the power loss for the functional component. For example, if the expected power usage is 1.0 watts and the actual power used by the functional component is 1.2 watts, then the power loss for the functional component would be 0.2 watts.

The power management engine 265 may then add the power loss to the expected power usage for each functional component of the video doorbell device 114. This updated expected power usage may be included in the information associated with the functional components in memory 269. The power management engine 265 may then determine the sum of all of the expected power usages and power loss for all of the functional components of the video doorbell device 114. The power management engine 265 may determine the power threshold and/or the below power threshold to be this sum of all of the expected power usages and power losses for all of the functional components of the video doorbell device 114. For example, the LED 250 (e.g., the IR LED and/or visible LED) may have an expected power usage of 1.0 watts, the camera 230 may have an expected power usage of 3.0 watts, the chime/alarm 245 may have an expected power usage of 2.0 watts, the microphone 240 may have an expected power usage of 1.5 watts, the speaker 235 may have an expected power usage of 1.5 watts, the heater 260 may have an expected power usage of 3.0 watts, the transmitter/receiver 255 may have an expected power usage of 2.0 watts, and the processor 210 may have an expected power usage of 5.0 watts. Based on these example expected power usages, the maximum expected power usage for the camera-based device 114, 124A-B may be determined as (1.0+0.2)+(3.0+0.2)+(2.0+0.2)+(1.5+0.2)+(1.5+0.2)+(3.0+0.2)+(2.0+0.2)+(5.0+0.2)=20.6 watts. For example, the maximum expected power usage may be determined based on the expected power usage of each functional component without evaluating actual loss occurring at one or more of the functional components and based on the figures above would be 19.0 watts. For example, the maximum expected power usage for the video doorbell device 114 may be the power threshold and/or the below power threshold.

The power management engine 265 may compare the input power to the power threshold or the below power threshold (e.g., either the preset power threshold/below power threshold or the calculated power threshold/below power threshold) for the video doorbell device 114. For example, if the input power is less than the power threshold, then the input power does not satisfy the power threshold. For example, if the input power is less than the below power threshold, then the input power satisfies the below power threshold. For example, the input power not satisfying the power threshold or satisfying the below power threshold may indicate that the input power is not sufficient to power all of the functional components of the video doorbell device 114.

At 340, a determination may be made to set one or more functional components of the video doorbell device 114 to an active status (e.g., activating). Setting a functional component to an active status means the particular functional component is available for use by the video doorbell device 114 when that functional component is needed but does not necessarily mean that the particular functional component is active at all times. For example, the determination may be made by the power management engine 265 or another portion of the video doorbell device 114. For example, the determination may be based on the input power and/or all or at least a portion of the information associated with the plurality of functional components for the video doorbell device 114.

For example, the video doorbell device 114 may include a predetermined listing, order, or priority of activation (or setting to an active status) of the functional components (or groups of functional components) of the video doorbell device 114 based on the input power (e.g., in the event there is insufficient input power to power all of the functional components) and/or the information associated with the functional components. For example, the order of activation may be based on user input received from a user via, for example, the user device 128 or another computing device, that provides a priority of the functional components to operate on the video doorbell device 114 based on the input power (e.g., in the event there is insufficient input power to power all of the functional components) and the information associated with the functional components. For example, the listing, order, or priority of activation may be received by the power management engine 265 from memory 269.

For example, one or more functional components may be mandatory functional components for activation based on the inability for the camera-based device 114, 124A-B to operate without those functional components. Examples of mandatory functional components may include the processor 210 and the power management engine 265 and/or other functional components. The power management engine 265 may determine, based on, for example, the predetermined or user provided order, which additional functional components may also be activated without exceeding the determined input power for the video doorbell device 114. For example, the power management engine 265 may determine a running sum of expected power usage and actual loss (as determined above) for each functional component to be activated in the predetermined or user selected order until the amount of expected power usage and actual loss for the next functional component, when added to the running sum, would be greater than the input power for the video doorbell device 114. For example, the next functional component and each additional functional component not yet added to the running sum of power usage for the video doorbell device 114 would not be activated and functional components already included in the running sum may be activated and/or set at an active status such that those functional components will function when needed (e.g., the chime 245, microphone 240, speaker 235, camera 230, transmitter/receiver 255, etc.).

For example, in addition or in the alternative, the determination may be made to activate one or more functional components of the video doorbell device 114 based on the input power not satisfying the power threshold, the input power satisfying the below power threshold, or the input power being insufficient for (e.g., not satisfying) the maximum power needs of the video doorbell device 114.

A message or notification may be sent by the video doorbell device 114. The message or notification may be sent based on the input power and the information associated with the functional components of the video doorbell device 114. In addition, or in the alternative, the message or notification may be sent based on the input power not satisfying the power threshold or the input power satisfying the below power threshold. For example, the message or notification may be sent to a user device (e.g., the user device 128) associated with the video doorbell device 114 or a user device associated with the premises 112. For example, the message or notification may be sent to the user device via the gateway device 126 and/or network 108 or another network. For example, the message or notification may be one of an email message, a text message, or an instant message.

The message or notification may include a notice or indication that the input power is not sufficient (e.g., not sufficient to power all of the functional components of the video doorbell device 114). The message or notification may include a notice or indication that one or more functional components of the video doorbell device 114 will not be activated (e.g., placed in an active status) due to the insufficiency of the input power. The message or notification may include a notice or indication of which functional components of the video doorbell device 114 will be activated (e.g., in an active status) and which functional components will not be activated (e.g., deactivated). The message or notification may include a notice or indication that the transformer 132 or the output from the transformer 132 is too small to provide sufficient input power to the video doorbell device 114 to power all of the functional components of the video doorbell device 114 (e.g., at the same time).

The message or notification may also provide a link or URL to a user interface associated with the video doorbell device 114. The video doorbell device 114 may cause the user interface to be generated or displayed on the user device 128. The user interface may receive one or more inputs from a user associated with the user device 128 that set or modify which functional components to activate on the video doorbell device 114, which functional components to not activate, and/or which functional components to modify an activation status or level (e.g., a reduced power mode, a reduced time of activation while the component is in an active state, a reduced intensity (e.g., for the LED 250), a reduced resolution (e.g., for the camera 230) etc.)) in order to reduce the amount of power needed by the video doorbell device 114.

At 350, one or more functional components of the video doorbell device 114 may be set to an active status (e.g., activated) or caused to be set to an active status. Setting a functional component to an active status means the particular functional component is available for use by the video doorbell device 114 when that functional component is needed but does not necessarily mean that the particular functional component is active at all times. For example, the chime/alarm 245 may only be active at certain times (such as when a visitor to the premises 112 presses a button associated with the chime/alarm) when the chime/alarm 245 is in an active status. For example, the one or more functional components may be set at an active status by the power management engine 265 or another portion of the video doorbell device 114. For example, the one or more functional components may be caused to be set to an active status by the computing device 102 or the user device 128. For example, the one or more functional components may be set to an active status based on the determined one or more functional components to activate.

Figure 4:
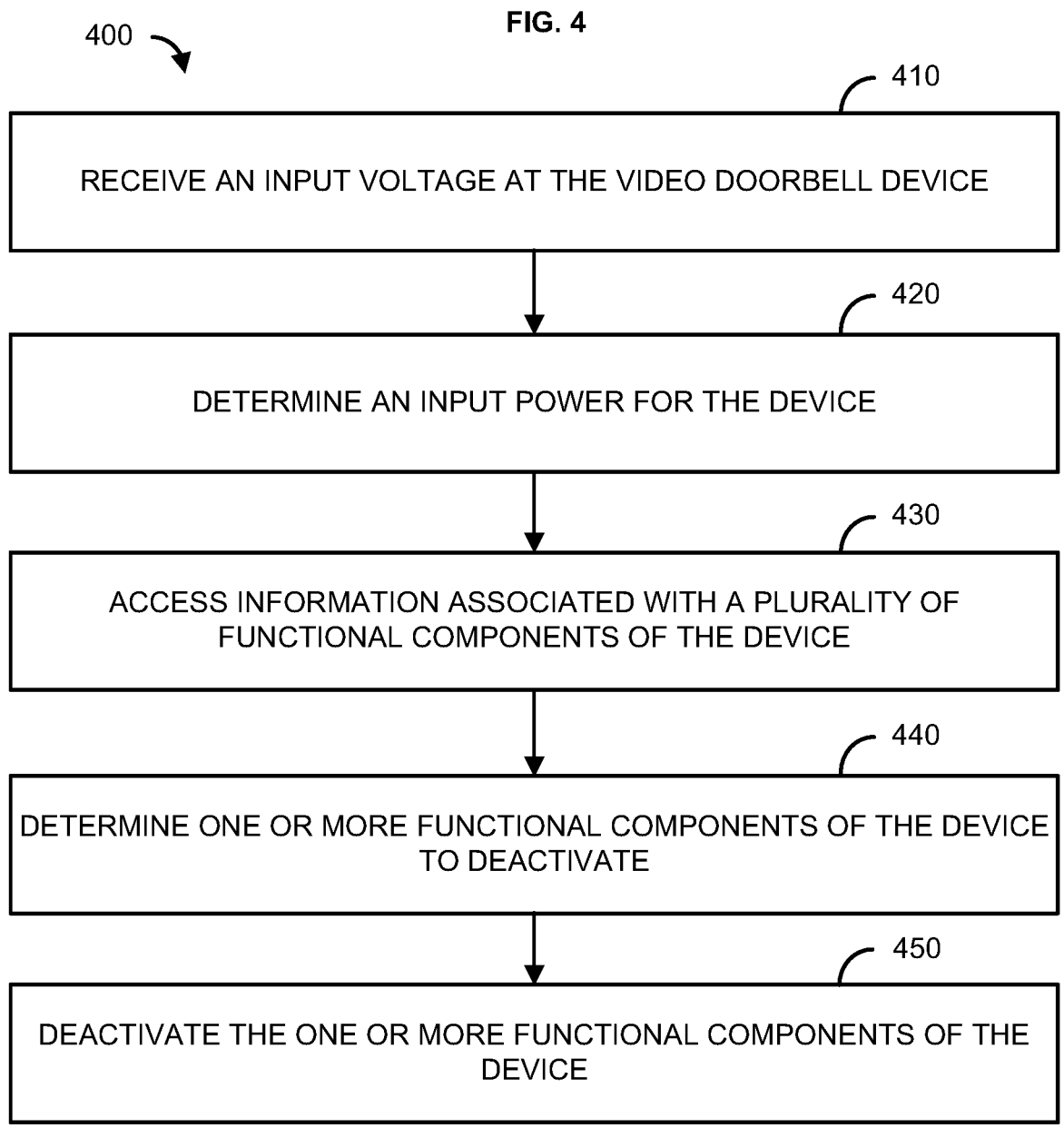
FIG. 4 shows a flowchart of an example method for power management of a camera-based device.

FIG. 4 shows a flowchart of an example method 400 for power management of a camera-based device. The methods described in FIG. 4 may be completed by the camera-based device (e.g., the video doorbell 114 or the video camera 124A-B). While the method 400 will describe as being completed by the video doorbell device 114, this is for example purposes only, as all or any portion of the method 400 may be completed by another form of camera-based device (e.g., the video camera 124A-B, a security device, etc.) or any other computing device described herein, such as the computing device 102.

At 410, an input voltage may be received at a video doorbell device 114. For example, the input voltage may be received from the transformer 132, which receives line voltage from mains power at, for example, the circuit breaker panel 130 of the premises 112. For example, the input voltage may be AC voltage. For example the AC voltage may be low voltage AC (e.g., any amount between and including 4 volts to 60 volts AC). The input voltage may be received at the video doorbell device 114 by the analog-to-digital converter 270 of the video doorbell device 114.

At 420, the input power for the video doorbell device 114 may be determined. For example, the input power may be determined by the video doorbell device 114. For example, the input power may be determined based on the received input voltage at the video doorbell device 114. For example, the input power may be determined by the power management engine 265 or another portion of the video doorbell device 114. For example, the analog-to-digital converter 270, or another portion of the video doorbell device 114, may sample the input voltage one or a plurality of times to determine a minimum input voltage level being received at the video doorbell device 114. The power management engine 265 may receive the one or more input voltage samplings from the converter 270. For example, the minimum input voltage may be the lowest input voltage identified by the converter 270 from the plurality of voltage samplings. For example, the minimum input voltage may be an average of the lowest input voltages identified in each of the samplings of the input voltage by the power management engine 265. For example, the minimum input voltage level may be determined based on the received input voltage by determining the voltage level of the received input voltage without determining a minimum received input voltage level.

Based on the minimum input voltage, the power management engine 265 may determine the input power (in watts) for the video doorbell device 114. For example, the input power may be based on input voltage originating from one or more of the mains power 130 (via the transformer 132, or the battery 215. For example, the input power may be determined based on the minimum input voltage and the current for the video doorbell device 114. For example, the input power may be determined based on a product of the minimum input voltage and the current for the video doorbell device 114.

The power management engine 265 or another portion of the video doorbell device 114 may also determine the size (output voltage) of the transformer 132. For example, the power management engine 265 may determine the output voltage for the transformer based on the input power and/or input voltage received by the video doorbell device 114 at the analog-to-digital converter 270. For example, the size (output voltage) of the transformer 132 may be greater than the input voltage received by the video doorbell device 114 due to loss in the transmission lines 136 between the transformer 132 and the video doorbell device 114. For example, the power management engine 265 may determine that the transformer 132 is an 8-volt transformer based on the input voltage being less than 8 volts at the video doorbell device 114. For example, the power management engine 265 may determine that the transformer 132 is a 16-volt transformer based on the input voltage at the video doorbell device 114 being greater than 8 volts but less than 16 volts.

At 430, information (e.g., data) may be accessed. The information may be associated with a plurality of functional components for the video doorbell device 114. For example, the information may comprise an indication or identifier of each functional component of the video doorbell device 114, one or more operating levels (e.g., activation status), if multiple operating levels are available for the particular functional component, for each functional component, a power level (e.g., a minimum or average power level or amount of power) required to operate each particular functional component at the particular operating level, a priority level for one or more of the functional components or groups of functional components that signifies or designates an order in which the functional components should be activated (e.g., set to an active status or turned on), deactivated (e.g., no power is provided to the component), and/or have their operating levels adjusted, and/or a user preference designation for one or more of the functional components that signifies or designates an order in which the user has selected which functional components should be activated (e.g., set to an active status or turned on), deactivated (e.g., no power is provided to the component), and/or have their operating levels adjusted or provides a listing of the functional components that the user has identified as having to be activated (e.g., set to an active status or turned on). For example, the information may be accessed by the power management engine 265. For example, the information may be accessed from one or more of the memory 269 or the power management engine 265.

For example, the input power may be determined to not satisfy (e.g., is not equal to or greater than) a power threshold for the video doorbell device 114. For example, the determination may be made by the power management engine 265 or another portion of the video doorbell device 114. For example, the power threshold may indicate the minimum amount of input power needed to power all of the functional components of the video doorbell device 114. For example, the power threshold may be a preset value for the video doorbell device 114 or may be determined (e.g., calculated) by the power management engine 265.

For example, the input power may be determined to satisfy (e.g., is less than) a below power threshold for the video doorbell device 114. For example, the determination may be made by the power management engine 265 or another portion of the video doorbell device 114. For example, the below power threshold may indicate the minimum amount of input power needed to power all of the functional components of the video doorbell device 114. For example, the below power threshold may be a preset value for the video doorbell device 114 or may be determined (e.g., calculated) by the power management engine 265. For example, the below power threshold may be the same value as the power threshold and is provided herein with a different indicator based on determining whether or not the threshold is satisfied.

For example, the power management engine 265 may activate or turn on a functional component for the video doorbell device 114. For example, the functional component may have a known expected power usage. For example, the functional component may be the LED 250 (e.g., the IR LED or visible LED) or any other functional component of the video doorbell device 114. The power management engine 265 may determine the amount of actual power used by the functional component. The power management engine 265 may compare the actual power used by the functional component to the expected power usage for the functional component (e.g., included in the information of memory 269). For example, the power management engine 265 may determine the difference between the actual power used by the functional component and the expected power usage for the functional component. The difference may be determined to be the power loss for the functional component. For example, if the expected power usage is 1.0 watts and the actual power used by the functional component is 1.2 watts, then the power loss for the functional component would be 0.2 watts.

The power management engine 265 may then add the power loss to the expected power usage for each functional component of the video doorbell device 114. This updated expected power usage may be included in the information associated with the functional components in memory 269. The power management engine 265 may then determine the sum of all of the expected power usages and power loss for all of the functional components of the video doorbell device 114. The power management engine 265 may determine the power threshold and/or the below power threshold to be this sum of all of the expected power usages and power losses for all of the functional components of the video doorbell device 114. For example, the LED 250 (e.g., the IR LED and/or visible LED) may have an expected power usage of 1.0 watts, the camera 230 may have an expected power usage of 3.0 watts, the chime/alarm 245 may have an expected power usage of 2.0 watts, the microphone 240 may have an expected power usage of 1.5 watts, the speaker 235 may have an expected power usage of 1.5 watts, the heater 260 may have an expected power usage of 3.0 watts, the transmitter/receiver 255 may have an expected power usage of 2.0 watts, and the processor 210 may have an expected power usage of 5.0 watts. Based on these example expected power usages, the maximum expected power usage for the camera-based device 114, 124A-B may be determined as (1.0+0.2)+(3.0+0.2)+(2.0+0.2)+(1.5+0.2)+(1.5+0.2)+(3.0+0.2)+(2.0+0.2)+(5.0+0.2)=20.6 watts. For example, the maximum expected power usage may be determined based on the expected power usage of each functional component without evaluating actual loss occurring at one or more of the functional components and based on the figures above would be 19.0 watts. For example, the maximum expected power usage for the video doorbell device 114 may be the power threshold and/or the below power threshold.

The power management engine 265 may compare the input power to the power threshold or the below power threshold (e.g., either the preset power threshold/below power threshold or the calculated power threshold/below power threshold) for the video doorbell device 114. For example, if the input power is less than the power threshold, then the input power does not satisfy the power threshold. For example, if the input power is less than the below power threshold, then the input power satisfies the below power threshold. For example, the input power not satisfying the power threshold or satisfying the below power threshold may indicate that the input power is not sufficient to power all of the functional components of the video doorbell device 114.

At 440, a determination may be made to deactivate one or more functional components of the video doorbell device 114. For example, the determination may be made by the power management engine 265 or another portion of the video doorbell device 114. For example, the determination may be based on the input power and/or all or at least a portion of the information associated with the plurality of functional components for the video doorbell device 114.

For example, the video doorbell device 114 may include a predetermined listing, order, or priority of deactivation (e.g., not providing power) of the functional components (or groups of functional components) of the video doorbell device 114 based on the input power (e.g., in the event there is insufficient input power to power all of the functional components) and/or the information associated with the functional components. For example, the order of deactivation may be based on user input received from a user via, for example, the user device 128 or another computing device, that provides a priority of the functional components to deactivate on the video doorbell device 114 in the event there is insufficient input power to power all of the functional components and the information associated with the functional components. For example, the listing, order, or priority of deactivation may be received by the power management engine 265 from memory 269.

For example, one or more functional components may be mandatory functional components for the operation of the video doorbell device 114 and may not be able to be deactivated. Examples of mandatory functional components may include the processor 210 and the power management engine 265 and/or other functional components. The power management engine 265 may determine, based on, for example, the information (e.g., the predetermined or user provided order), which other functional components (e.g., those that are not mandatory activation) to deactivate in order to get the power required by the video doorbell device 114 below or equal to the determined input power for the video doorbell device 114. For example, the power management engine 265 may reduce the maximum expected power usage for the video doorbell device 114 by the expected power usage and actual loss (as determined above) for each functional component to be deactivated in the predetermined or user selected order until the adjusted expected power usage is less than the input power for the video doorbell device 114. For example, each additional functional component that has not been determined to be deactivated would remain at an active status and may be activated when needed by the video doorbell device 114.

For example, in addition or in the alternative, the determination may be made to deactivate one or more functional components of the video doorbell device 114 based on the input power not satisfying the power threshold, the input power satisfying the below power threshold, or the input power being insufficient (e.g., not satisfying) the maximum power needs of the video doorbell device 114.

A message or notification may be sent by the video doorbell device 114. The message or notification may be sent based on the input power and the information associated with the functional components of the video doorbell device 114. In addition, or in the alternative, the message or notification may be sent based on the input power not satisfying the power threshold or the input power satisfying the below power threshold. For example, the message or notification may be sent to a user device (e.g., the user device 128) associated with the video doorbell device 114, a user device associated with the premises 112, or another computing device. For example, the message or notification may be sent to the user device 128 via the gateway device 126 and/or the network 108 or another network. For example, the message or notification may be one of an email message, a text message, or an instant message.

The message or notification may include a notice or indication that the input power is not sufficient (e.g., not sufficient to power all of the functional components of the video doorbell device 114). The message or notification may include a notice or indication that one or more functional components of the video doorbell device 114 will be deactivated due to the insufficiency of the input power. The message or notification may include a notice or indication of which functional components of the video doorbell device 114 will be deactivated and which functional components will not be deactivated (e.g., remain activated or in an active status). The message or notification may include a notice or indication that the transformer 132 or the output from the transformer 132 is too small to provide sufficient input power to the video doorbell device 114 to power all of the functional components of the video doorbell device 114.

The message or notification may also provide a link or URL to a user interface associated with the video doorbell device 114. The video doorbell device 114 may cause the user interface to be generated or displayed on the user device 128. The user interface may receive one or more inputs from a user associated with the user device 128 that set or modify which functional components to deactivate on the video doorbell device 114, which functional components to activate, and/or which functional components to modify (e.g., reduce but not deactivate) an activation status or level (e.g., a reduced power mode, a reduced time of activation, a reduced intensity (e.g., for the LED 250), a reduced resolution (e.g., for the camera 230) etc.) in order to reduce the amount of power needed by the video doorbell device 114.

At 450, one or more functional components of the video doorbell device 114 may be deactivated (e.g., no power provided to the functional component) or caused to be deactivated. Deactivating the functional component means the particular functional component is not available for use by the video doorbell device 114 (e.g., the battery heater 260 will not be able to heat any battery 215 associated with the video doorbell device 114, the chime/alarm 245 will not operate, etc. For example, the one or more functional components may be deactivated by the power management engine 265 or another portion of the video doorbell device 114. For example, the one or more functional components may be caused to be deactivated by the computing device 102 or the user device 128. For example, the one or more functional components may be deactivated based on the determined one or more functional components to deactivate.

Figure 5:
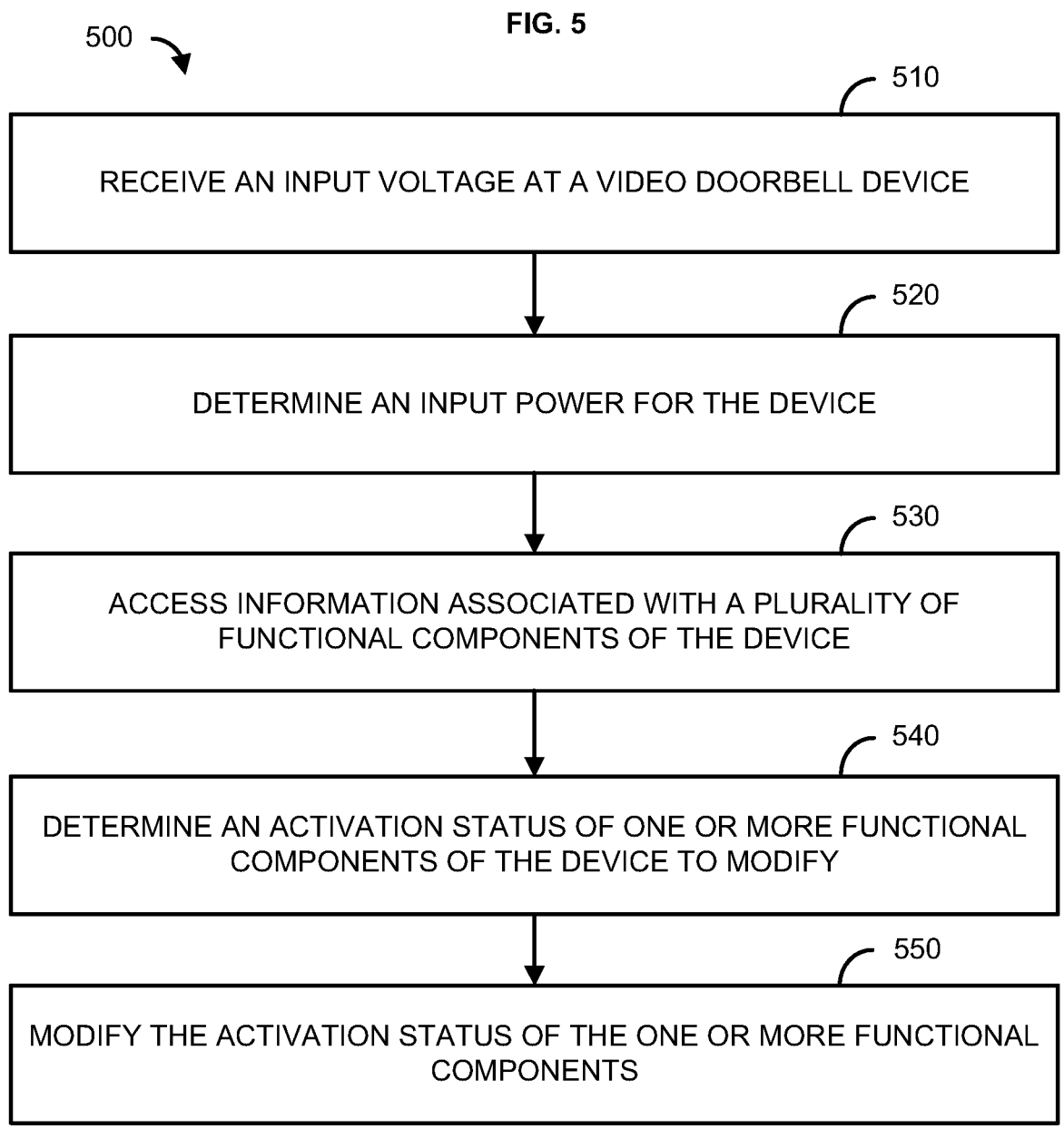
FIG. 5 shows a flowchart of an example method for power management of a camera-based device.

FIG. 5 shows a flowchart of an example method 500 for power management of a camera-based device. The methods described in FIG. 5 may be completed by the camera-based device (e.g., the video doorbell 114 or the video camera 124A-B). While the method 500 will describe as being completed by the video doorbell device 114, this is for example purposes only, as all or any portion of the method 500 may be completed by another form of camera-based device (e.g., the video camera 124A-B, a security device, etc.) or any other computing device described herein, such as the computing device 102.

At 510, an input voltage may be received at the video doorbell device 114. For example, the input voltage may be received from the transformer 132, which receives line voltage from mains power at, for example, the circuit breaker panel 130 of the premises 112. For example, the input voltage may be AC voltage. For example the AC voltage may be low voltage AC (e.g., any amount between and including 4 volts to 60 volts AC). The input voltage may be received at the video doorbell device 114 by an analog-to-digital converter 270 of the video doorbell device 114.

At 520, the input power for the video doorbell device 114 may be determined. For example, the input power may be determined by the video doorbell device 114. For example, the input power may be determined based on the received input voltage at the video doorbell device 114. For example, the input power may be determined by the power management engine 265 or another portion of the video doorbell device 114. For example, the analog-to-digital converter 270, or another portion of the video doorbell device 114, may sample the input voltage one or a plurality of times to determine a minimum input voltage level being received at the video doorbell device 114. The power management engine 265 may receive the one or more input voltage samplings from the converter 270. For example, the minimum input voltage may be the lowest input voltage identified by the converter 270 from the plurality of voltage samplings. For example, the minimum input voltage may be an average of the lowest input voltages identified in each of the samplings of the input voltage. For example, the minimum input voltage level may be determined based on the received input voltage by determining the voltage level of the received input voltage without determining a minimum received input voltage level.

Based on the minimum input voltage, the power management engine 265 may determine the input power (in watts) for the video doorbell device 114. For example, the input power may be based on input voltage originating from one or more of the mains power 130 (via the transformer 132) or the battery 215. For example, the input power may be determined based on the minimum input voltage and the current for the video doorbell device 114. For example, the input power may be determined based on a product of the minimum input voltage and the current for the video doorbell device 114.

The power management engine 265 or another portion of the video doorbell device 114 may also determine the size (output voltage) of the transformer 132. For example, the power management engine 265 may determine the output voltage for the transformer based on the input power and/or input voltage received by the video doorbell device 114 at the analog-to-digital converter. For example, the size (output voltage) of the transformer 132 may be greater than the input voltage received by the video doorbell device 114 due to loss in the transmission lines 136 between the transformer 132 and the video doorbell device 114. For example, the power management engine 265 may determine that the transformer 132 is an 8-volt transformer based on the input voltage being less than 8 volts at the video doorbell device 114. For example, the power management engine 265 may determine that the transformer 132 is a 16-volt transformer based on the input voltage at the video doorbell device 114 being greater than 8 volts but less than 16 volts.

At 530, information (e.g., data) may be accessed. The information may be associated with a plurality of functional components for the video doorbell device 114. For example, the information may comprise an indication or identifier of each functional component of the video doorbell device 114, one or more operating levels (e.g., activation status), if multiple operating levels are available for the particular functional component, for each functional component, a power level (e.g., a minimum or average power level or amount of power) required to operate each particular functional component at the particular operating level, a priority level for one or more of the functional components or groups of functional components that signifies or designates an order in which the functional components should be activated (e.g., set to an active status or turned on), deactivated (e.g., no power is provided to the component), and/or have their operating levels adjusted, and/or a user preference designation for one or more of the functional components that signifies or designates an order in which the user has selected which functional components should be activated (e.g., set to an active status or turned on), deactivated (e.g., no power is provided to the component), and/or have their operating levels adjusted or provides a listing of the functional components that the user has identified as having to be activated (e.g., set to an active status or turned on). For example, the information may be accessed by the power management engine 265. For example, the information may be accessed from one or more of the memory 269 or the power management engine 265.

For example, the input power may be determined to not satisfy (e.g., is not equal to or greater than) a power threshold for the video doorbell device 114. For example, the determination may be made by the power management engine 265 or another portion of the video doorbell device 114. For example, the power threshold may indicate the minimum amount of input power needed to power all of the functional components of the video doorbell device 114. For example, the power threshold may be a preset value for the video doorbell device 114 or may be determined (e.g., calculated) by the power management engine 265.

For example, the input power may be determined to satisfy (e.g., is less than) a below power threshold for the video doorbell device 114. For example, the determination may be made by the power management engine 265 or another portion of the video doorbell device 114. For example, the below power threshold may indicate the minimum amount of input power needed to power all of the functional components of the video doorbell device 114. For example, the below power threshold may be a preset value for the video doorbell device 114 or may be determined (e.g., calculated) by the power management engine 265. For example, the below power threshold may be the same value as the power threshold and is provided herein with a different indicator based on determining whether or not the threshold is satisfied.

For example, the power management engine 265 may activate or turn on a functional component for the video doorbell device 114. For example, the functional component may have a known expected power usage. For example, the functional component may be the LED 250 (e.g., the IR LED or visible LED) or any other functional component of the video doorbell device 114. The power management engine 265 may determine the amount of actual power used by the functional component. The power management engine 265 may compare the actual power used by the functional component to the expected power usage for the functional component (e.g., included in the information of memory 269). For example, the power management engine 265 may determine the difference between the actual power used by the functional component and the expected power usage for the functional component. The difference may be determined to be the power loss for the functional component. For example, if the expected power usage is 1.0 watts and the actual power used by the functional component is 1.2 watts, then the power loss for the functional component would be 0.2 watts.

The power management engine 265 may then add the power loss to the expected power usage for each functional component of the video doorbell device 114. This updated expected power usage may be included in the information associated with the functional components in memory 269. The power management engine 265 may then determine the sum of all of the expected power usages and power loss for all of the functional components of the video doorbell device 114. The power management engine 265 may determine the power threshold and/or the below power threshold to be this sum of all of the expected power usages and power losses for all of the functional components of the video doorbell device 114. For example, the LED 250 (e.g., the IR LED and/or visible LED) may have an expected power usage of 1.0 watts, the camera 230 may have an expected power usage of 3.0 watts, the chime/alarm 245 may have an expected power usage of 2.0 watts, the microphone 240 may have an expected power usage of 1.5 watts, the speaker 235 may have an expected power usage of 1.5 watts, the heater 260 may have an expected power usage of 3.0 watts, the transmitter/receiver 255 may have an expected power usage of 2.0 watts, and the processor 210 may have an expected power usage of 5.0 watts. Based on these example expected power usages, the maximum expected power usage for the camera-based device 114, 124A-B may be determined as (1.0+0.2)+(3.0+0.2)+(2.0+0.2)+(1.5+0.2)+(1.5+0.2)+(3.0+0.2)+(2.0+0.2)+(5.0+0.2)=20.6 watts. For example, the maximum expected power usage may be determined based on the expected power usage of each functional component without evaluating actual loss occurring at one or more of the functional components and based on the figures above would be 19.0 watts. For example, the maximum expected power usage for the video doorbell device 114 may be the power threshold and/or the below power threshold.

The power management engine 265 may compare the input power to the power threshold or the below power threshold (e.g., either the preset power threshold/below power threshold or the calculated power threshold/below power threshold) for the video doorbell device 114. For example, if the input power is less than the power threshold, then the input power does not satisfy the power threshold. For example, if the input power is less than the below power threshold, then the input power satisfies the below power threshold. For example, the input power not satisfying the power threshold or satisfying the below power threshold may indicate that the input power is not sufficient to power all of the functional components of the video doorbell device 114.

At 540, a determination may be made to modify (e.g., reduce but not deactivate) the activation status or level of one or more functional components of the video doorbell device 114. For example, some functional components of the video doorbell device 114 may be able to operate a two or more different levels, with each level consuming a different level of power. For example, the LED 250 may operate at full brightness or half brightness. At full brightness, the LED 250 may use, for example, 1.0 watts, while at half brightness, the LED 250 may use, for example, 0.5 watts of power when activated. In another example, the transmitter/receiver 255 may operate at a first power level or a second power level that is less than the first power level and uses less power than the first power level. As another example, the processor 210 may operate at full processing speed or at 75% processing speed. At full processing speed, the processor 210 may use, for example, 5.0 watts while at 75% processing speed, the processor 210 may use, for example. 3.5 watts. In another example, the camera 230 may record video at a first resolution and a second resolution that is less than the first resolution. When recording video at the first resolution, the camera 230 may use, for example, 3.0 watts, while recording at the second resolution, the camera 230 may use, for example, 2.0 watts. Other functional components of the video doorbell device 114 not specifically discussed herein may also have the ability to operate at a modified level that reduces the amount of power the particular functional component uses. Further, while functional components above have been described as having two different operating levels, this is for example only, as some functional components may be configured to operate at more than two levels.

For example, the determination to modify the activation status or level of one or more functional components may be made by the power management engine 265 or another portion of the video doorbell device 114. For example, the determination may be based on the input power and/or all or at least a portion of the information associated with the plurality of functional components for the vide doorbell device 114.

For example, the video doorbell device 114 may include a predetermined listing, order, or priority for modifying the activation statuses or levels of the functional components of the video doorbell device 114 based on the input power (e.g., in the event there is insufficient input power to power all of the functional components at the highest activation statuses or levels) and/or the information associated with the functional components. For example, the order of modifying activation statuses or levels may be based on user input received from a user via, for example, the user device 128 or another computing device, that provides a priority of the functional components to operate a full operating level or priority of functional components to adjust to a lower operating level on the video doorbell device 114 in the event there is insufficient input power to power all of the functional components at the highest activation statuses or levels (e.g., greatest speed, highest resolution, brightest light output, etc.) and/or power all of the functional components and based on the information associated with the functional components. For example, the listing, order, or priority of modifying activations levels for the functional components may be received by the power management engine 265 from memory 269. The power management engine 265 may determine, based on, for example, the predetermined or user provided order in the information, which functional components may have their activation status or level modified to reduce the total expected power usage of the video doorbell device 114 below the determined input power for the video doorbell device 114. For example, the power management engine 265 may reduce the activation status or level of the one or more functional components in the predetermined or user provided order until the adjusted expected power usage for the video doorbell device 114 is below the input power level for the video doorbell device 114. For example, the power management engine may use a combination of activating (e.g., setting at an active status) certain functional components, deactivating certain functional components, and/or modifying the activation status or level of certain functional components as described in FIGS. 3-5 in order to reduce the adjusted expected power usage for the video doorbell device 114 below the input power received by the video doorbell device 114.

For example, in addition or in the alternative, the determination may be made to modify (e.g., reduce but not deactivate) the activation status or level of one or more functional components of the video doorbell device 114 based on the input power not satisfying the power threshold, the input power satisfying the below power threshold, or the input power being insufficient (e.g., not satisfying) the maximum power needs of the video doorbell device 114.

A message or notification may be sent by the video doorbell device 114. The message or notification may be sent based on the input power and the information associated with the functional components of the video doorbell device 114. In addition, or in the alternative, the message or notification may be sent based on the input power not satisfying the power threshold or the input power satisfying the below power threshold. For example, the message or notification may be sent to a user device (e.g., the user device 128) associated with the video doorbell device 114 or a user device associated with the premises 112. For example, the message or notification may be sent to the user device via the gateway device 126 and/or network 108 or another network. For example, the message or notification may be one of an email message, a text message, or an instant message.

The message or notification may include a notice or indication that the input power is not sufficient (e.g., not sufficient to power all of the functional components of the camera-based device 114, 124A-B or not sufficient to power all of the functional components at the highest activation status). The message or notification may include a notice or indication that the activation status or level of one or more functional components of the video doorbell device 114 will be modified due to the insufficiency of the input power. The message or notification may include a notice or indication of which functional components of the video doorbell device 114 will have the activation status or level modified and which will not. The message or notification may include a notice or indication that the transformer 132 or the output from the transformer 132 is too small to provide sufficient input power to the video doorbell device 114 to power all of the functional components of the camera-based device 114, 124A-B at their respective highest activation status or level). The message or notification may also include a notice or indication of the size of the transformer 132.

The message or notification may also provide a link or URL to a user interface associated with the video doorbell device 114. The video doorbell device 114 may cause the user interface to be generated or displayed on the user device 128. The user interface may receive one or more inputs from a user associated with the user device 128 that set or modify which functional components to modify the activation status or level for the functional components on the video doorbell device 114 (e.g., a reduced power mode, a reduced time of activation, a reduced intensity (e.g., for the LED 250), a reduced resolution (e.g., for the camera 230) etc.), which functional components to deactivate (e.g., not provide input power to), and/or which functional components to activate (e.g., set at an active status) in order to reduce the amount of power needed by the video doorbell device 114.

At 550, the activation status or level of one or more functional components of the video doorbell device 114 may be modified (e.g., reduced but not deactivated) or caused to be modified (e.g., reduced but not deactivated). For example, the activation status or level may be modified by the power management engine 265 or another portion of the video doorbell device 114. For example, the activation status or level may be caused to be modified by the computing device 102 or the user device 128. For example, the activation status or level of the one or more functional components may be modified based on the determined one or more functional components to modify.

In certain examples, the camera-based device may include the battery 215, the battery may need to be recharged from time-to-time, and due to ambient temperatures, the battery 215 may need to be heated, by the battery heater 260 before the recharge process can occur. In certain examples, the power requirements to operate the battery heater 260 may result in the camera-based device (e.g., the video doorbell device 114) not having sufficient power to operate one or more other functional components of the device.

For example, a determination may be made if the battery 215 needs to be heated before the recharge process should be begin. For example, the determination may be made by the power management engine 265 or another component of the camera-based device 114, 124A-B. For example, the power management engine 265 may receive an indication of the temperature of the battery 215 from the battery monitor 225. The power management engine 265 may compare the temperature of the battery 215 to a temperature threshold. The power management engine 265 may determine if the temperature of the battery 215 satisfies the temperature threshold (indicating battery warming is not necessary) or does not satisfy the temperature threshold (indicating that battery warming is necessary prior to recharging the battery 215). The power management engine 265 may determine the amount of power needed to activate the battery heater 260 and warm the battery 215. For example, the amount of power needed may be based on the temperature of the battery 215 and/or the difference between the temperature of the battery 215 and the temperature threshold. For example, the power management engine 265 may determine that the input power is not sufficient (or satisfies a low power threshold or does not satisfy a power threshold) indicating there is enough input power to operate the battery heater 260 and all of the other functional components (or at least those functional components set to an active status (as described in FIG. 3)) at the highest activation status (as described in FIG. 5). For example, the power management engine 265 may determine which one or more functional components to deactivate (as described in FIG. 4) or modify the activation status of (as described in FIG. 5) in order to have sufficient input power to operate the battery heater 260 and those functional components that remain at an active status at the determined activation status level. For example, the determination of which functional components to deactivate or change the activation status level of may be based on a user-provided priority order indicating an order of deactivation and/or order of changing of activation status level, based on a pre-set priority order indicating the same, and/or based on the current operational needs of the device.

Figure 6:
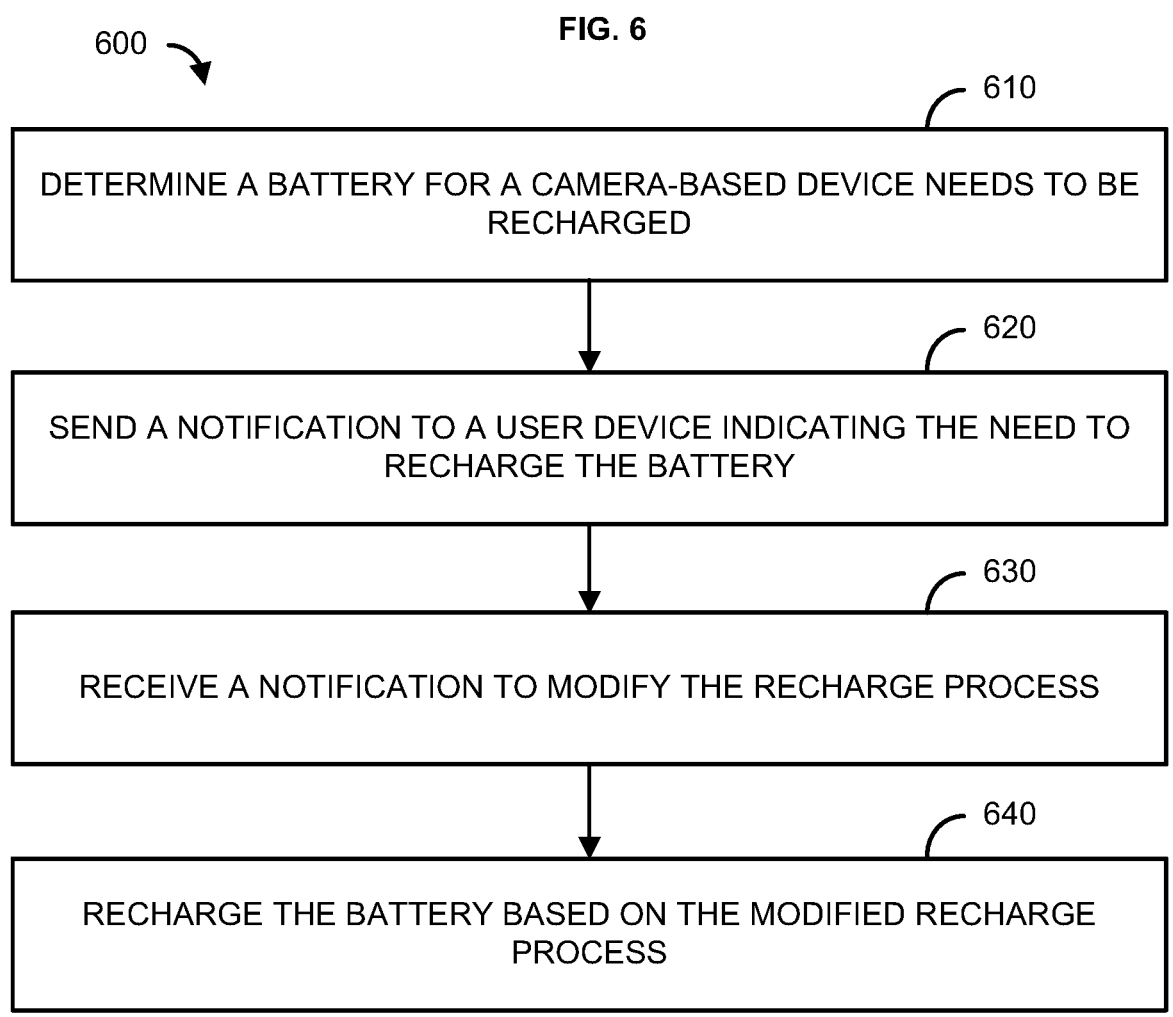
FIG. 6 shows a flowchart of an example method for power management of a camera-based device.

FIG. 6 shows a flowchart of an example method 600 for power management of a camera-based device. The methods described in FIG. 6 may be completed by the camera-based device (e.g., the video doorbell 114 or the video camera 124A-B). While the method 600 will describe as being completed by the camera-based device 114, 124A-B, this is for example purposes only, as all or any portion of the method 600 may be completed by any other computing device described herein, such as the computing device 102. Once the battery 215 has been sufficiently heated (e.g., to satisfy the temperature threshold) and/or the recharging process for the battery 215 is completed) the power management engine 265 may, for the one or more functional components that were deactivated or had their activation status level changed, return those one or more functional components back to an active status and/or set their activation status level back to where it was prior to the battery warming process.

At 610, a determination may be made that one or more batteries (e.g., the battery 215) of a camera-based device 114, 124A-B needs to be recharged. For example, the determination may be made by the power management engine 265 or another component of the camera-based device 114, 124A-B. For example, the camera-based device 114, 124A-B may determine the current charge level for the battery 215. For example, the current charge level for the battery 215 may be monitored by the battery monitor 225 and provided to the power management engine 265. The power management engine 265 may determine that the battery 215 needs to be recharged based on the current charge level for the battery 215. For example, the power management engine 265 may compare the current charge level for the battery to a recharge threshold. The recharge threshold may be a preset value and may be indicative of one or more of the percentage of charge left in the battery 215, the amount of voltage (e.g., voltage level) of or being output by the battery 215, or the amount of amp-hours of charge remaining in the battery 215. For example, the power management engine 265 may determine if the current charge level satisfies (e.g., is equal to or less than) the recharge threshold. Based on the current charge level satisfying the recharge threshold, the power management engine 265 may determine that the battery 215 needs to be recharged.

A determination may be made regarding the amount of time until the charge level for the battery 215 reaches a secondary recharge threshold. For example, the determination may be made by the power management engine 265 or another component of the camera-based device 114, 124A-B. For example, the secondary recharge threshold may be indicative of the charge level of the battery 215 being critically low. For example, the secondary recharge threshold may be indicative of a point in time where recharging the battery 215 would be mandatory rather than optional. For example, the secondary recharge threshold may be indicative of a minimum charge level for the battery 215 to continue powering one or more functional components (e.g., the functional components for which the battery 215 is programmed to provide power to) of the camera-based device 114, 124A-B. For example, the power management engine 265 may compare the current charge level for the battery 215 to the secondary recharge threshold to determine a difference between the current charge level and the secondary recharge threshold. The power management engine 265 may determine the amount of time based on the difference between the current charge level and the secondary recharge threshold. For example, the power management engine 265 may determine the amount of time until the charge level for the battery 215 reaches a secondary recharge threshold based on the difference and the current power load on the battery 215 or a historical power load on the battery 215. For example, the amount of time may be indicated by a number of minutes until the charge level for the battery 215 reaches a secondary recharge threshold.

A determination may be made if the battery 215 needs to be heated before the recharge process should be begin. For example, the determination may be made by the power management engine 265 or another component of the camera-based device 114, 124A-B. For example, the power management engine 265 may receive an indication of the temperature of the battery 215 from the battery monitor 225. The power management engine 265 may compare the temperature of the battery 215 to a temperature threshold. The power management engine 265 may determine if the temperature of the battery 215 satisfies the temperature threshold (indicating battery warming is not necessary) or does not satisfy the temperature threshold (indicating that battery warming is necessary prior to recharging the battery 215. The power management engine 265 may determine the amount of power needed to activate the battery heater 260 and warm the battery 215. For example, the amount of power needed may be based on the temperature of the battery 215 and/or the different between the temperature of the battery 215 and the temperature threshold. For example, the amount of time until the charge level for the battery 215 reaches a secondary recharge threshold may be adjusted based on the determined amount of power needed to warm the battery 215 prior to recharging the battery 215.

A message or notification may be generated. For example, the message or notification may be generated by the power management engine 265 or another portion of the camera-based device 114, 124A-B. For example, the message or notification may include text or other information indicating that the battery 215 of the camera-based device 114, 124A-B needs to be recharged. For example, the message or notification may be one of an email message, a text message, or an instant message. For example, the message or notification may include a camera-based device identifier (e.g., a name, unique number, or location for the camera-based device 114, 124A-B) that indicates the particular camera-based device 114, 124A-B that needs its battery 215 recharged. For example, the message or notification may include a user identifier and/or premises identifier indicating the identity of the user associated with the camera-based device 114, 124A-B or the premises 112 on which the camera-based device 114, 124A-B is located. The message or notification may also include an address, URL, link, or the like provide instructions for recharging the battery 215.

At 620, the message or notification may be sent. For example, the message or notification may be sent by the camera-based device 114, 124A-B (e.g., the power management engine 265 or another component of the camera-based device 114, 124A-B). For example, the message or notification may be sent by the transmitter/receiver 255 of the camera-based device 114, 124A-B to the computing device 102 via the gateway device 126 and the network 108 or another network. For example, the message or notification may be sent by the transmitter/receiver 255 of the camera-based device 114, 124A-B to the user device 128 via the gateway device 126. For example, the camera-based device 114, 124A-B may cause the message or notification to be displayed on the user device 128 by sending the message or notification.

The computing device 102 may receive the message or notification. For example, the computing device 102 may receive the message or notification via the network 108 or another network. For example, the computing device 102 may parse the message or notification to identify one or more of the device identifier, user identifier, or premises identifier in the message or notification. Based on one or more of the device identifier, user identifier, or premises identifier, the computing device 102 may determine an address (e.g., URL address or email address) or phone number associated with the camera-based device 114, 124A-B and to which the message or notification is to be sent. The computing device 102 may send the message or notification to the user device 128 via the network 108 or another network and the gateway device 126. While the example, shows the camera-based device 114, 124A-B and the user device being located on the same premises 112, this is for example purposes only, as the user device 128 may be located on a different premises from that of the camera-based device 114, 124A-B. In another example, the camera-based device 114, 124A-B may send the message or notification directly to the user device 128 via the gateway 126 and one or more networks, if necessary.

The user device 128 may receive the message or notification. For example, the user device 128 may receive the message or notification via the gateway device 128 and the network 108 or another network. For example, the user device 128 may receive the message or notification from one of the computing device 102 and/or the camera-based device 114, 124A-B. The user device 128 may cause the message or notification to be displayed on a display associated with the user device 128. For example, the user device 128 may cause the message or notification to be displayed based on a received user input at the user device 128 selecting the message or notification for display. For example, a user interface associated with the camera-based device 114, 124A-B may be generated and/or displayed on the user device 128. The user interface may be generated or displayed based on the received user input. For example, the user interface may be generated or displayed based on receiving a second user input selecting a link or URL included in the received and displayed message or notification.

The user interface may provide one or more pages or screens that allow a user, via a user device 128, to select a time to begin recharging the battery 215, to modify the time to begin recharging the battery 215, to select the recharging procedure to use when recharging the battery 215, and/or to end a recharge process prior to the battery 215 being fully recharged. For example, there may be particular times during a day when it is more convenient or safer (due to less likelihood of visitors) to recharge the battery 215 than other times. Accordingly, providing the user with the opportunity to modify the time the recharge process will begin and the procedure used for the recharge process on the battery 215 may be preferable.

Figure 7:
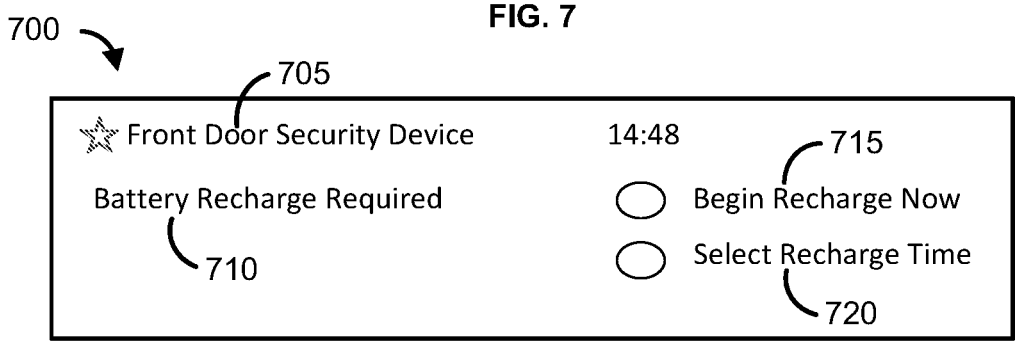
FIG. 7 shows an example user interface for power management of a camera-based device.
Figure 8:
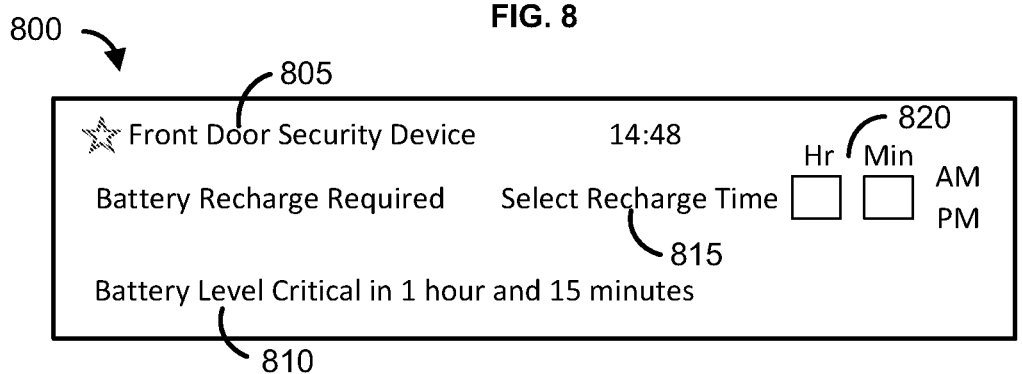
FIG. 8 shows an example user interface for power management of a camera-based device.
Figure 9:
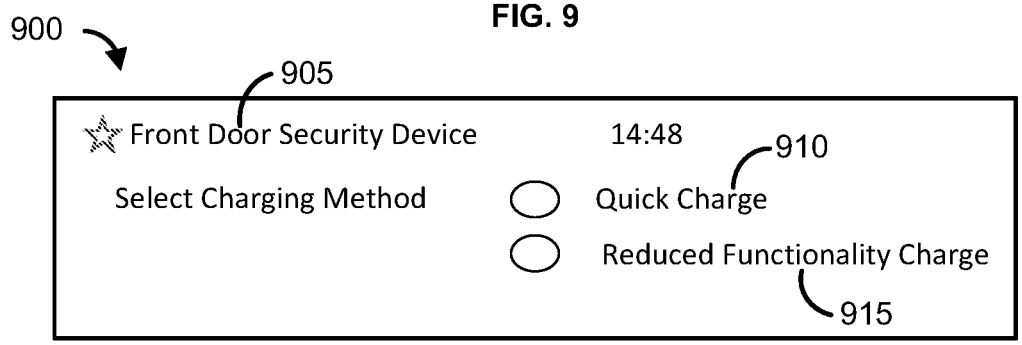
FIG. 9 shows an example user interface for power management of a camera-based device.

FIGS. 7-9 show examples of portions 700-900 of the user interface for managing the power (e.g., the recharge process) for the camera-based device 114, 124A-B. The user interface may be generated by the computing device 102 or another computing device. Each portion 700-900 of the user interface may include one or more options for which a user may input a selection via, for example, the user device 128 or another computing device. Each portion 700-900 may be presented for display on one or multiple pages of the user interface. For example, one portion (e.g., portion 800) may not be displayed until a selection is received at a prior option (e.g., portion 700). Further, the technique for presenting the portions 700-900 of the user interface and for receiving a user input of a selection, as shown in FIGS. 7-9 is for example only, as may other ways for displaying the same information and for providing options for the user to select via user input (such as drop-down tables and the like) are contemplated herein.

For example, the first portion 700 of the user interface displayed may include the camera-based device identifier 705 identifying the particular camera-based device 114, 124A-B. For example, the camera-based device identifier 705 may be a unique name, number of the location of the particular camera-based device 114, 124A-B. The first portion 700 may also indicate at 710 that the battery 215 for that particular camera-based device 114, 124A-B needs to be recharged. The portion 700 may also include a plurality of options 715, 720 for when to begin recharging the battery 215. For example, the plurality of options may include a first option 715 to begin recharging the battery 215 immediately and a second option 720 to select another time to recharge the battery 215. Other example options may include providing a particular time to being charging the battery, providing one or more amounts of delay (e.g., 30 minutes, 1 hour, 2 hours, etc.) to delay the beginning of the recharge process, or the like. Each option 715, 720 may be selectable or associated with a selection area that the user, via user input at the user device 128, may select the particular option 715, 720.

For example, if a user input is received for option 715, a message or notification may be sent to the camera-based device 114, 124A-B to begin recharging the battery 215. For example, the message may be sent by the computing device 102 to the camera-based device 114, 124A-B via the network 108 or another network. For example, the message or notification may be sent to the camera-based device 114, 124A-B by the user device 128 via the gateway device 126.

For example, if a user input is received for option 715 (for selecting a different recharge time), a second portion 800 of the user interface may be displayed or made accessible to the user via, for example, the user device 128. For example, the second portion 800 of the user interface may be associated with providing a user with the opportunity to select a particular time to begin the recharge process. For example, the second portion 800 may include the camera-based device identifier 805. The second portion may also include an indicator 810 of the amount of time until the charge level for the battery 215 reaches a secondary recharge threshold. For example, the secondary recharge threshold may be indicative of the charge level of the battery 215 being critically low, the point in time where recharging the battery 215 would be mandatory rather than optional, and/or, the time at which a minimum charge level has been reached for the battery 215 to continue powering one or more functional components (e.g., the functional components for which the battery 215 is programmed to provide power to) of the camera-based device 114, 124A-B. The indicator 810 may provide notice as to the latest time that the recharge process may be delayed. The second portion 800 may include an indicator 815 to select the recharge time for the battery 215 and a time selection input 820. The time selection input 820 may be configured to receive an hour input, a minute input, and/or an AM/PM input.

A user input may be received at the second portion 800 of the user interface. The user input may include a time for beginning the recharge process on the battery of the camera-based device. The user input may be provided by a user at the user device 128. A message or notification may be sent to the camera-based device 114, 124A-B indicating the time to begin recharging the battery 215. For example, the message may be sent by the computing device 102 to the camera-based device 114, 124A-B via the network 108 or another network. For example, the message or notification may be sent to the camera-based device 114, 124A-B by the user device 128 via the gateway device 126.

The user may also be provided with an opportunity to select or modify how the camera-based device 114, 124A-B recharges the battery 215. For example, multiple options for recharging the battery 215 may be made available for selection, by user input, via the user interface. For example, a third portion 900 of the user interface may be displayed or made accessible to the user via, for example, the user device 128. For example, the third portion 900 of the user interface may be associated with providing a user with the opportunity to select or modify how the camera-based device 114, 124A-B recharges the battery 215. For example, the third portion 900 of the user interface may include the camera-based device identifier 905.

The third portion 900 may also include multiple options 910, 915 for recharging the battery 215. For example, the options 910, 915 may differ on the amount of time it will take to fully recharge the battery 215. For example the amount of time to fully recharge the battery 215 may differ for each option 910, 915 based on a different amount or group of functional components that are disabled (e.g., thereby providing additional power that may be directed to the recharge process) during the recharge process for the particular option. For example, a first option for recharging the battery may be a quick charge option 910. The quick charge option 910 may be the fastest way to recharge the battery 215. However, the quick charge option 910 may prevent the camera-based device 114, 124A-B from operating during the recharge process. A second option for recharging the battery may be a reduced functionality charge option 915. The reduced functionality charge option 915 may not recharge the battery 215 as quickly as the quick charge option 910. However, the reduced functionality charge option 915 may permit the camera-based device 114, 124A-B to continue operating during the recharge process with only some functional components disabled.

A user input may be received at the third portion 900 of the user interface for one of the charging options 910, 915. The user input may be provided by a user at the user device 128. A message or notification may be sent to the camera-based device 114, 124A-B indicating the charging option to use for recharging the battery 215. For example, the message may be sent by the computing device 102 to the camera-based device 114, 124A-B via the network 108 or another network. For example, the message or notification may be sent to the camera-based device 114, 124A-B by the user device 128 via the gateway device 126. While the example of FIGS. 7-9 describe three separate messages being sent to the camera-based device 114, 124A-B, this is for example purposes only. In other examples, a single message that includes two or more of the indication to recharge the battery 215 at another time, the time to recharge the battery 215, or the charge option to use for recharging the battery 215 may be sent to the camera-based device 114, 124A-B as described above.

At 630, one or more messages or notifications are received to modify the recharge process for the battery 215 of the camera-based device 114, 124A-B. For example, the one or more messages or notifications may be received by the camera-based device 114, 124A-B. For example, the one or more messages or notifications may be received from the computing device 102 or the user device 128. For example, the one or more messages or notifications may be received, based on the one or more user inputs received at the user interface. For example, the one or more messages or notifications may indicate a time to recharge the battery 215 (e.g., such as immediately or at another time) and/or the charge option to use for recharging the battery 215. The power management engine 265 or another portion of the camera-based device 114, 124A-B may evaluate the one or more messages and determine, based on the one or more messages or notifications, the time to begin recharging the battery 215 and the charge process to use for recharging the battery 215.

A determination may be made regarding which functional components of the camera-based device 114, 124A-B to disable during the recharge process. The determination may be made by the power management engine 265 or another portion of the camera-based device 114, 124A-B. For example, the power management engine 265 may determine the functional components to disable based on the charge process to use for recharging the battery 215. For example, a table or listing of functional components of the camera-based device 114, 124A-B to disable may be associated with each particular charge process that is available.

At 640, battery 215 may be recharged. For example, the battery 215 may be recharged by the one or more processors 210. For example, power management engine 265 may disable the one or more functional components determined to be disabled based on the charge process to be used for recharging the battery 215. At least a portion of the power that was previously being used to power those one or more functional components may be directed to recharging the battery 215 and battery heating, if necessary. If battery heating was determined to be necessary, the battery heater 260 may be activated to heat the battery 215 to an acceptable temperature (e.g., satisfying the temperature threshold) for recharging. The power management engine may determine, based on battery heating and data from the battery monitor 225 that the adjusted battery temperature of the battery 215 satisfies the temperature threshold. The battery 215 may be recharged. For example, the battery 215 may be recharged based on the battery satisfying the temperature threshold.

The power management engine 265 via the battery monitor 225 may monitor the recharge process for the battery 215. The power management engine 265 may determine that the battery 215 has been fully recharged. For example, the power management engine 265 may determine the battery 215 has been fully recharged based on the battery level determined at the battery monitor 225. Based on the determination that the battery 215 is fully recharged, the power management engine 265 or another portion of the camera-based device 114, 124A-B may change the one or more functional components of the camera-based device 114, 124A-B previously deactivated for the charging process back to an active status.

The power management engine 265 may generate a message or notification that the recharge process is complete. The message or notification may include the camera-based device identifier, user identifier, or premises identifier. The message or notification may be sent by the camera-based device 114, 124A-B (e.g., the power management engine 265 or another component of the camera-based device 114, 124A-B). For example, the message or notification may be sent by the transmitter/receiver 255 of the camera-based device 114, 124A-B to the computing device 102 via the gateway device 126 and the network 108 or another network. For example, the message or notification may be sent by the transmitter/receiver 255 of the camera-based device 114, 124A-B to the user device 128 via the gateway device 126. For example, the camera-based device 114, 124A-B may cause the message or notification to be displayed on the user device 128 by sending the message or notification.

The computing device 102 may receive the message or notification. For example, the computing device 102 may receive the message or notification via the network 108 or another network. For example, the computing device 102 may parse the message or notification to identify one or more of the device identifier, user identifier, or premises identifier in the message or notification. Based on one or more of the device identifier, user identifier, or premises identifier, the computing device 102 may determine an address (e.g., URL address or email address) or phone number associated with the camera-based device 114, 124A-B and to which the message or notification is to be sent. The computing device 102 may send the message or notification to the user device 128 via the network 108 or another network and the gateway device 126.

The user device 128 may receive the message or notification. For example, the user device 128 may receive the message or notification via the gateway device 128 and the network 108 or another network. For example, the user device 128 may receive the message or notification from one of the computing device 102 and/or the camera-based device 114, 124A-B. The user device 128 may cause the message or notification to be displayed on a display associated with the user device 128. For example, the user device 128 may cause the message or notification to be displayed based on a received user input at the user device 128 selecting the message or notification for display.

Figure 10:
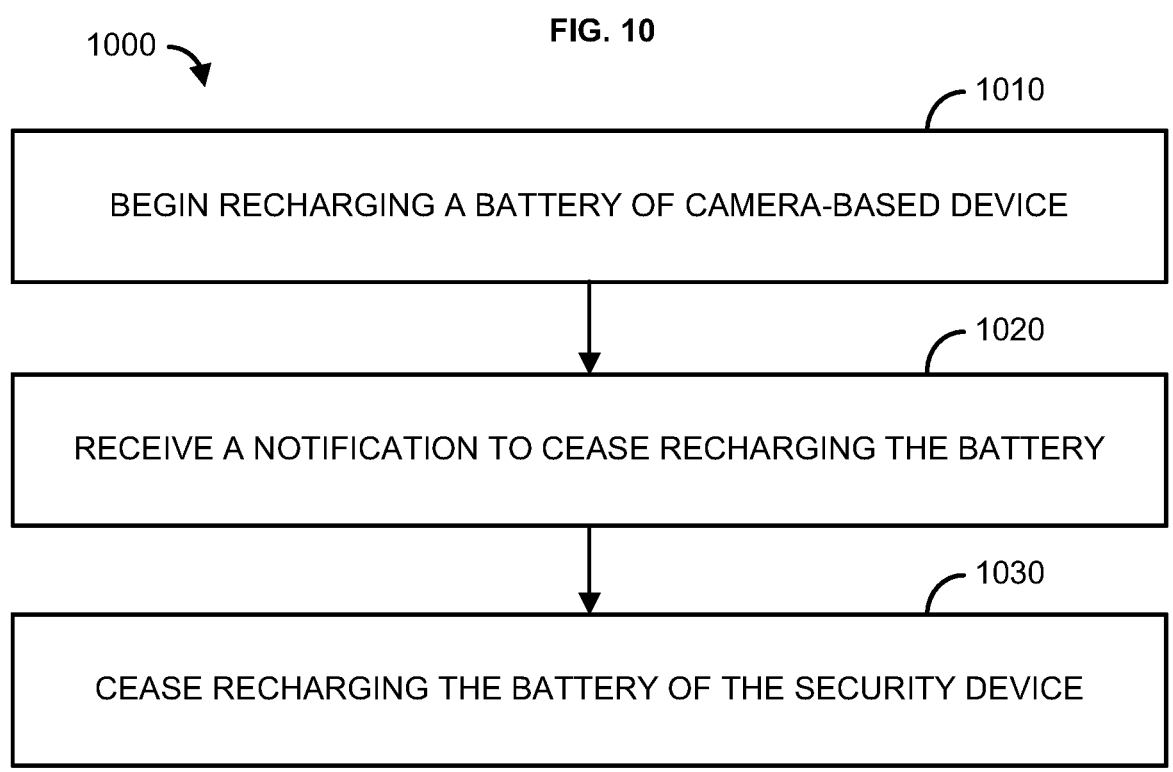
FIG. 10 shows a flowchart of an example method for power management of a camera-based device.

FIG. 10 shows a flowchart of an example method 1000 for power management of a camera-based device. The methods described in FIG. 10 may be completed by the camera-based device (e.g., the video doorbell 114 or the video camera 124A-B). While the method 1000 will describe as being completed by the camera-based device 114, 124A-B, this is for example purposes only, as all or any portion of the method 100 may be completed by any other computing device described herein, such as the computing device 102.

At 1010, a recharging process may begin for recharging one or more batteries (e.g., the battery 215) of the camera-based device 114, 124A-B. For example, the recharging of the battery 215 may be done by the camera-based device 114, 124A-B. For example, the recharge process may be any of the recharge processes described in FIGS. 6 and 9 or another recharge process. For example, one or more functional components of the camera-based device 114, 124A-B may be deactivated during the recharge process. For example, the camera-based device 114, 124A-B may be unable to operate or have limited capabilities during the recharge process. For example, the chime/alarm 245 may not operate for the camera-based device 114, 124A-B during the recharge process. For example, one or more of the speaker 235 and microphone 240 may not operate during the recharge process. For example, the camera 230 may not operate during the recharge process, or the camera 230 may be unable to provide continuous video recording during the recharge process.

At 1020, a message or notification may be received to cease or stop charging the battery 215 of the camera-based device 114, 124A-B. For example, the message or notification may be received by the camera-based device 114, 124A-B. For example, the message or notification may be generated at the user device 128 or another computing device. For example, the message or notification may be generated based on a user input at the user device 128 or another computing device. For example, a user may determine that there is a need to end the recharge process and return the camera-based device 114, 124A-B to a fully operational mode or an increased operational mode even though the battery 215 of the camera-based device 114, 124A-B has not been fully recharged. The user may input a request in the form of the message or notification, for example at the user device 128, for the camera-based device 114, 124A-B to exit the recharge process that the camera-based device 114, 124A-B is currently conducting on the battery 215. The message or notification may be generated from a user interface associated with the camera-based device 114, 124A-B similar to that described in FIGS. 6-9. The message or notification may be sent by the user device 128 to the camera-based device 114, 124A-B. For example, the message or notification may be received by the camera-based device 114, 124A-B from the computing device 102 or the user device 128. For example, the message or notification may be sent by the user device 128 to the computing device 120 via the gateway device 126 and the network 108 or another network. The computing device 102 may determine that the message or notification is associated with the camera-based device 114, 124A-B (e.g., based on a camera-based device identifier in the message or notification) and may send the message or notification to the particular camera-based device 114, 124A-B via the network 108 or another network and the gateway device 126. For example, the user device 128 may send the message or notification to the camera-based device 114, 124A-B via the gateway device 126.

At 1030, the recharge process for the battery 215 of the camera-based device 114, 124A-B may be stopped or ceased. For example, the recharge process may be ceased by the camera-based device 114, 124A-B (e.g., the power management engine 265). The camera-based device 114, 124A-B may cease the recharge process for the battery 215 based on receiving the notification to cease the recharge process.

For example, the power management engine 265 may cause the processor 210 to stop recharging the battery 215. The power management engine 265 or another portion of the camera-based device 114, 124A-B may change one or more functional components of the camera-based device 114, 124A-B previously deactivated for the charging process back to an active status. For example, all of the functional components previously deactivated for the charging process may be set to an active status so that they will activate when needed by the camera-based device 114, 124A-B. The camera-based device 114, 124A-B may then operate in a normal operating mode with all functional components or at least more functional components (than during the recharge process) active or at an active status such that they may be activated when needed by the camera-based device 114, 124A-B. The camera-based device 114, 124A-B may continue to operate in the normal operating mode until a determination is made that the battery 215 for the camera-based device 114, 124A-B needs to be recharged, as described in FIG. 6, or until a further notification or message is received by the camera-based device 114, 124A-B (e.g., from the user device 128 or another computing device) to return to the recharge process for recharging the battery 215. Based on this further notification or message, the power management engine 265 or another portion of the camera-based device 114, 124A-B may disable one or more functional components of the camera-based device 114, 124A-B and may continue the recharge process to recharge the battery 215.

Figure 11:
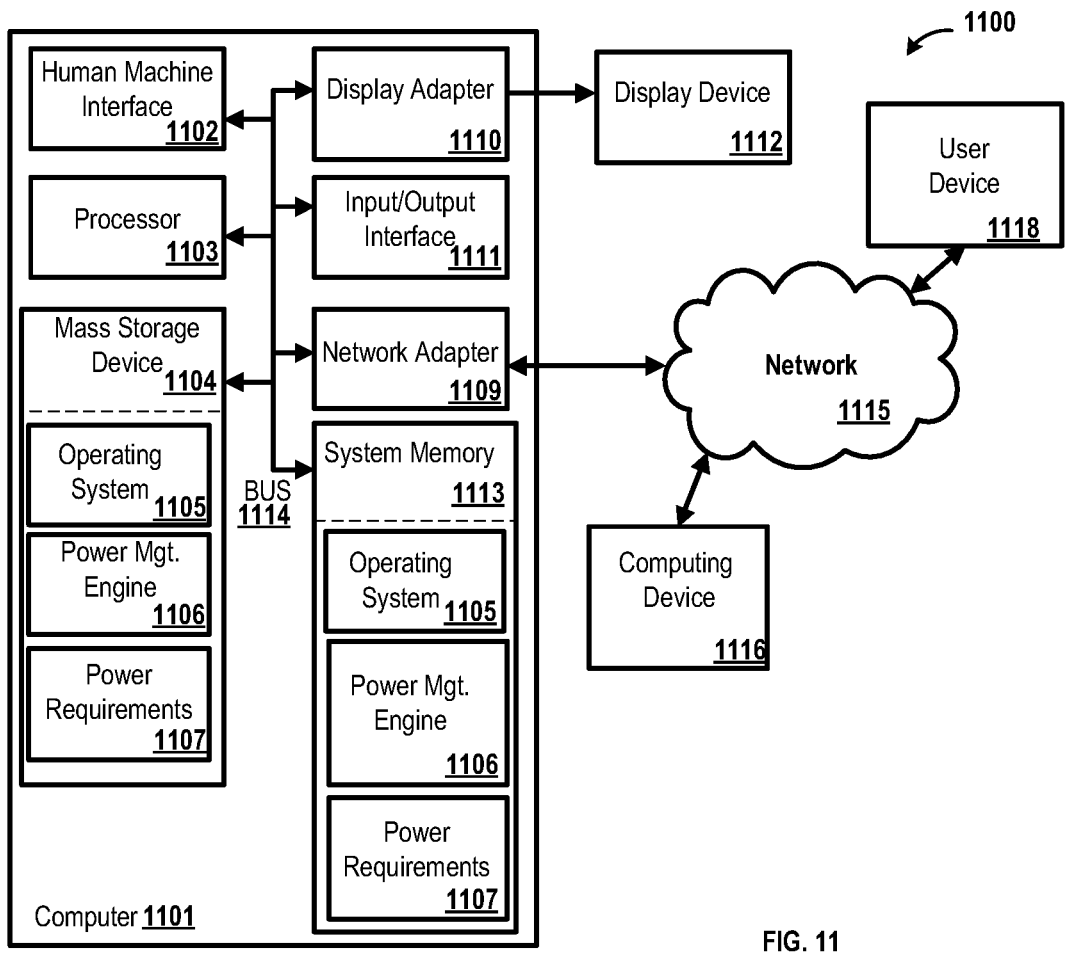
FIG. 11 shows a block diagram of an example computing device for managing power of a camera-based device.

FIG. 11 shows a system 1100 for power management of camera-based devices. Any one or more of the camera-based device 114, 124A-B, the computing device 102, the user device 128, or the gateway 126, of FIG. 1 may be a computer 1101 as shown in FIG. 11.

The computer 1101 may comprise one or more processors 1103, a system memory 1113, and a bus 1114 that couples various components of the computer 1101 including the one or more processors 1103 to the system memory 1113. In the case of multiple processors 1103, the computer 1101 may utilize parallel computing.

The bus 1114 may comprise one or more of several possible types of bus structures, such as a memory bus, memory controller, a peripheral bus, an accelerated graphics port, and a processor or local bus using any of a variety of bus architectures.

The computer 1101 may operate on and/or comprise a variety of computer-readable media (e.g., non-transitory). Computer-readable media may be any available media that is accessible by the computer 1101 and includes, non-transitory, volatile and/or non-volatile media, and removable and non-removable media. The system memory 1113 has computer-readable media in the form of volatile memory, such as random access memory (RAM), and/or non-volatile memory, such as read-only memory (ROM). The system memory 1113 may store data and/or program modules such as an operating system 1105, the power management engine 1106, and power requirements 1107 that are accessible to and/or are operated on by the one or more processors 1103.

The computer 1101 may also comprise other removable/non-removable, volatile/non-volatile computer storage media. The mass storage device 1104 may provide non-volatile storage of computer code, computer-readable instructions, data structures, program modules, and other data for the computer 1101. The mass storage device 1104 may be a hard disk, a removable magnetic disk, a removable optical disk, magnetic cassettes or other magnetic storage devices, flash memory cards, CD-ROM, digital versatile disks (DVD) or other optical storage, RAM, ROM, electrically erasable programmable read-only memory (EEPROM), and the like.

Any number of program modules may be stored on the mass storage device 1104. An operating system 1105, the power management engine 1106, and power requirements 1107 may be stored on the mass storage device 1104. One or more of the operating system 1105, power management engine 1106, and power requirements 1107 (or some combination thereof) may comprise one or more program modules.

A user may enter commands and information into the computer 1101 via an input device (not shown). Such input devices include, but are not limited to, a keyboard, pointing device (e.g., a computer mouse or remote control), a microphone, a joystick, a scanner, tactile input devices such as gloves, and other body coverings, a motion sensor, and the like These and other input devices may be connected to the one or more processors 1103 via a human-machine interface 1102 that is coupled to the bus 1114, but may be connected by other interface and bus structures, such as a parallel port, game port, an IEEE 1394 Port (also known as a Firewire port), a serial port, network adapter 1109, and/or a universal serial bus (USB).

A display device 1112 may also be connected to the bus 1114 via an interface, such as a display adapter 1110. It is contemplated that the computer 1101 may have zero displays or more than one display adapter 1110 and the computer 1101 may have more than one display device 1112. A display device 1112 may be a monitor, an LCD (Liquid Crystal Display), a light-emitting diode (LED) display, a television, smart lens, smart glass, and/or a projector. In addition to the display device 1112, other output peripheral devices may comprise components such as speakers (not shown) and a printer (not shown) which may be connected to the computer 1101 via Input/Output Interface 1111. Any step and/or result of the methods may be output (or caused to be output) in any form to an output device. Such output may be any form of visual representation, including, but not limited to, textual, graphical, animation, audio, tactile, and the like. The display 1112 and computer 1101 may be part of one device, or separate devices.

The computer 1101 may operate in a networked environment using logical connections to one or more computing devices, such as the one or more remote computing devices 1116 and the one or more user devices 1118. The one or more remote computing devices 1116 may comprise a personal computer, computing station, workstation, portable computer, laptop computer, a network computer, a server or cloud computing device, and so on. The one or more user devices 1118 may comprise one or more of a client device, a personal computer, computing station, workstation, portable computer, laptop computer, mobile phone, tablet device, smartphone, smartwatch, or the like. Logical connections between the computer 1101, the one or more remote computing devices 1116, and the one or more user devices 1118 may be made via a network 1115, such as a local area network (LAN) and/or a general wide area network (WAN) and one or more network devices (e.g., a router, an edge device, an access point or other common network nodes, such as a gateway). Such network connections may be through a network adapter 1109. The network adapter 1109 may be implemented in both wired and wireless environments. Such networking environments are conventional and commonplace in dwellings, offices, enterprise-wide computer networks, intranets, and the Internet.

Application programs and other executable program components such as the operating system 1105, the power management engine 1106, and the power requirements 1107 are shown herein as discrete blocks, although it is recognized that such programs and components may reside at various times in different storage components of the computing device 1101, and are executed by the one or more processors 1103 of the computer 1101. Any of the disclosed methods may be performed by processor-executable instructions embodied on computer-readable media.

While specific configurations have been described, it is not intended that the scope be limited to the particular configurations set forth, as the configurations herein are intended in all respects to be possible configurations rather than restrictive.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; the number or type of configurations described in the specification.

It will be apparent to those skilled in the art that various modifications and variations may be made without departing from the scope or spirit. Other configurations will be apparent to those skilled in the art from consideration of the specification and practice described herein. It is intended that the specification and described configurations be considered as exemplary only, with a true scope and spirit being indicated by the following claims.

What is claimed is:

1. A method comprising:
   receiving, by a video doorbell device, an input voltage;
   determining, based on the input voltage, an input power for the device;
   accessing information associated with a plurality of functional components of the device, wherein the information comprises a power level associated with each functional component of the plurality of functional components;
   determining, based on the input power and the information, one or more functional components of the plurality of functional components to set to an active status on the device; and
   setting the one or more functional components of the device to the active status.

2. The method of claim 1, further comprising:
   determining, based on the input power and the information, one or more additional functional components of the plurality of functional components to deactivate; and
   deactivating the one or more additional functional components of the device.

3. The method of claim 1, wherein setting the one or more functional components to the active status comprises supplying the one or more functional components with a portion of the input power.

4. The method of claim 1, wherein receiving the input voltage comprises:
   receiving, by the device, the input voltage at a plurality of voltage levels; and
   determining a minimum input voltage level of the plurality of voltage levels as the input voltage.

5. The method of claim 1, further comprising:
   sending, to a user device and based on the input power being less than a power threshold, a notification that the input voltage is not sufficient to power all of the plurality of functional components of the device.

6. The method of claim 1, further comprising:
   receiving, from a user device and based on an indication that a battery of the device needs to be recharged, a notification to modify a recharge process for the battery; and
   modifying the recharge process for the battery.

7. The method of claim 1, wherein setting the one or more functional components to the active status comprises turning on the one or more functional components with a portion of the input power.

8. A method comprising:
receiving, by a video doorbell device, an input voltage;
determining, based on the input voltage, an input power for the device;
accessing information associated with a plurality of functional components of the device, wherein the information comprises a power level associated with each functional component of the plurality of functional components;
determining, based on the input power and the information, one or more functional components of the plurality of functional components to deactivate on the device; and
deactivating the one or more functional components of the device.

9. The method of claim 8, further comprising:
determining, based on the input power and the information, one or more additional functional components of the plurality of functional components to activate; and
activating the one or more additional functional components of the device.

10. The method of claim 8, wherein deactivating the one or more functional components comprises preventing the one or more functional components from receiving a portion of the input power.

11. The method of claim 8, wherein receiving the input voltage comprises:
receiving, by the device, the input voltage at a plurality of voltage levels; and
determining a minimum input voltage level of the plurality of voltage levels as the input voltage.

12. The method of claim 8, further comprising:
sending, to a user device and based on the input power being less than a power threshold, a notification that the input voltage is not sufficient to power all of the plurality of functional components of the device.

13. The method of claim 8, further comprising:
receiving, from a user device and based on an indication that a battery of the device needs to be recharged, a notification to modify a recharge process for the battery; and
modifying the recharge process for the battery.

14. The method of claim 8, wherein the input voltage comprises one or more of voltage from mains power or voltage from a battery.

15. A method comprising:
receiving, by a video doorbell device, an input voltage;
determining, based on the input voltage, an input power for the device;
accessing information associated with a plurality of functional components of the device, wherein the information comprises a power level associated with each functional component of the plurality of functional components;
determining an activation status of one or more functional components of the plurality of functional components to modify; and
based on the input power and the information, modifying the activation status of the one or more functional components of the plurality of functional components.

16. The method of claim 15, wherein modifying the activation status of a functional component of the one or more functional components comprises one of activating the functional component, deactivating the functional component, reducing an amount of time the functional component is on while the functional component is in an active state, reducing an output intensity of the functional component while maintaining the functional component in the active state, reducing a power level of the functional component while the functional component is in the active state, reducing a video resolution of the functional component while the functional component is in the active state, or reducing a speed of the functional component while the functional component is in the active state.

17. The method of claim 15, further comprising:
determining, based on the input power and the information, one or more additional functional components of the plurality of functional components to activate; and
activating the one or more additional functional components of the device.

18. The method of claim 15, further comprising:
determining, based on the input power and the information, one or more additional functional components of the plurality of functional components to deactivate; and
deactivating the one or more additional functional components of the device.

19. The method of claim 15, wherein receiving the input voltage comprises:
receiving, by the device, the input voltage at a plurality of voltage levels; and
determining a minimum input voltage level of the plurality of voltage levels as the input voltage.

20. The method of claim 15, wherein the input voltage comprises one or more of voltage from mains power or voltage from a battery.

* * * * *